United States Patent
Shimogori

(12) 
(10) Patent No.: US 9,129,324 B2
(45) Date of Patent: Sep. 8, 2015

(54) SOCIAL PLATFORM ECOMMERCE SYSTEM AND METHOD OF OPERATION

(75) Inventor: Kotaro Shimogori, Pacific Palisades, CA (US)

(73) Assignee: The Okanjo Company, LLC, Milwaukee, WI (US)

(*) Notice: Subject to any disclaimer, the term of this patent is extended or adjusted under 35 U.S.C. 154(b) by 647 days.

(21) Appl. No.: 13/253,447

(22) Filed: Oct. 5, 2011

(65) Prior Publication Data
US 2013/0090998 A1 Apr. 11, 2013

(51) Int. Cl.
G06Q 30/00 (2012.01)
G06Q 30/06 (2012.01)
G06Q 30/08 (2012.01)

(52) U.S. Cl.
CPC ........ *G06Q 30/0609* (2013.01); *G06Q 30/0601* (2013.01); *G06Q 30/08* (2013.01)

(58) Field of Classification Search
CPC .................. G06Q 30/0601; G06Q 30/0645
USPC ................................ 705/26.1–27.2
See application file for complete search history.

(56) References Cited

U.S. PATENT DOCUMENTS

| | | | |
|---|---|---|---|
| 6,185,545 B1 | 2/2001 | Resnick et al. | |
| 6,904,410 B1 | 6/2005 | Weiss et al. | |
| 7,263,506 B2 | 8/2007 | Lee et al. | |
| 7,324,968 B2 | 1/2008 | Rotman et al. | |
| 7,577,582 B1 | 8/2009 | Ojha et al. | |
| 7,630,924 B1 | 12/2009 | Collins et al. | |
| 7,711,725 B2 | 5/2010 | Rotholtz | |
| 7,930,237 B1 | 4/2011 | Rotman et al. | |
| 2002/0069157 A1 | 6/2002 | Jordan | |
| 2002/0147658 A1 | 10/2002 | Kwan | |
| 2004/0064351 A1 | 4/2004 | Mikurak | |
| 2005/0203857 A1 | 9/2005 | Friedman | |
| 2005/0289168 A1 | 12/2005 | Green et al. | |
| 2006/0136309 A1 | 6/2006 | Horn et al. | |
| 2007/0106551 A1 | 5/2007 | McGucken | |
| 2007/0214250 A1* | 9/2007 | Ahmed et al. | 709/223 |
| 2007/0214259 A1 | 9/2007 | Ahmed et al. | |
| 2008/0059327 A1 | 3/2008 | Bloomfield | |
| 2008/0126225 A1* | 5/2008 | Briggs et al. | 705/27 |
| 2008/0255962 A1 | 10/2008 | Chang et al. | |
| 2008/0256040 A1 | 10/2008 | Sundaresan et al. | |

(Continued)

OTHER PUBLICATIONS

BizRate signs agreement with america online to provide AOL members with certified merchant ratings. (Sep. 14, 1998).*

*Primary Examiner* — Resha Desai
(74) *Attorney, Agent, or Firm* — Jansson Munger McKinley and Shape Ltd.

(57) ABSTRACT

A social platform ecommerce system, method and computer-readable medium to engage in real-time communication through real time announcements or blogging are provided. The social platform ecommerce system, method and computer-readable medium may include a selling module for implementing social selling and determining a preferred selling method for an item, and a shipping module for determining the preferred method of shipping and the cost of shipping an item to a location designated by a buyer. Such methods and systems are socially conscious and may further include a giving application for providing a charitable contribution. A fraud checking module may also be included to check for, determine and prevent fraud by interrupting the sale and shipping process to ensure both the buyer and seller are protected during the ecommerce transaction.

24 Claims, 48 Drawing Sheets

(56) References Cited

U.S. PATENT DOCUMENTS

| | | |
|---|---|---|
| 2009/0070271 A1 | 3/2009 | Sarkissian et al. |
| 2009/0099853 A1 | 4/2009 | Lemelson |
| 2009/0138381 A1 | 5/2009 | Bloomfield |
| 2009/0265257 A1 | 10/2009 | Klinger et al. |
| 2009/0327008 A1 | 12/2009 | Collins et al. |
| 2010/0063873 A1 | 3/2010 | McGucken |
| 2010/0082456 A1 | 4/2010 | Chung |
| 2010/0274691 A1 | 10/2010 | Hammad et al. |
| 2011/0016052 A1 | 1/2011 | Scragg |
| 2011/0047013 A1 | 2/2011 | McKenzie, III |
| 2012/0197758 A1* | 8/2012 | Zhong et al. ............... 705/26.35 |

* cited by examiner

| Action Score |
| --- |
| dB      190 |

Seller Sample Action Scores

Seller ships an item within a day upon accepting an offer or end of auction: +0.5
Seller ships an item within two days upon accepting an offer or end of auction: +0.3
Seller ships an item within three days upon accepting an offer or end of auction: +0.1
Seller ships an items after three days upon accepting an offer or end of auction: -3

Each instance Seller accepts return: +.02

Buyer Sample Action Scores

Buyer pays within 6 hours of an accepted offer or end of auction: +1.0
Buyer pays within 12 hours of an accepted offer or end of auction: +0.5
Buyer pays within 24 hours of an accepted offer or end of auction: +0.3
Buyer pays within 2 days of an accepted offer or end of auction: +0.2
Buyer pays within 3 days of an accepted offer or end of auction: +0.1

Buyer does not pay within 3 days of an accepted offer or end of auction: -5
The second time a buyer does this: -10
The third time a buyer does this: -20
Fourth time, -50
Fifth time, -100 and the user is banned.

Buyer request returns a second item within a 30 day period: -.01
Buyer request returns a second item within a 14 day period: -.03
Buyer request returns a second item within a 7 day period: -.05
Buyer request returns a third item within a 30 day period: -1
Buyer request returns a third item within a 14 day period: -2

Figure 8

Buyer Sample Action Scores - continued

Buyer request returns a third item within a 7 day period: -3
Buyer request returns a fourth item within a 30 day period: -2
Buyer request returns a fourth item within a 14 day period: -5
Buyer request returns a fourth item within a 7 day period: -10
Buyer request returns a fifth item within a 30 day period: -10
Buyer request returns a fifth item within a 14 day period: -30
Buyer request returns a fifth item within a 7 day period: -50
Buyer request returns a sixth item within a 30 day period: -30
Buyer request returns a sixth item within a 14 day period: -50
Buyer request returns a sixth item within a 7 day period: -100, banned
Buyer request returns a seventh item within a 30 day period: -100, banned
Buyer request returns a seventh item within a 14 day period: -100, banned Buyer request a cancel for an item within a day of an accepted offer or end of auction: -0.5
Buyer request a cancel for an item within a 2 days of an accepted offer or end of auction: -1
Buyer request a cancel for an item within a 3 days of an accepted offer or end of auction: -3
Buyer request a cancel for a second item within a 30 day period: -1
Buyer request a cancel for a second item within a 14 day period: -3
Buyer request a cancel for a second item within a 7 day period: -5
Buyer request a cancel for a third item within a 30 day period: -3
Buyer request a cancel for a third item within a 14 day period: -7
Buyer request a cancel for a third item within a 7 day period: -10
Buyer request a cancel for a fourth item within a 30 day period: -10
Buyer request a cancel for a fourth item within a 14 day period: -30

Buyer request a cancel for a fourth item within a 7 day period: -50
Buyer request a cancel for a fifth item within a 30 day period: -30
Buyer request a cancel for a fifth item within a 14 day period: -50
Buyer request a cancel for a fifth item within a 7 day period: -100, Banned
Buyer request a cancel for a sixth item within a 30 day period: -50
Buyer request a cancel for a sixth item within a 14 day period: -100, Banned
Buyer request a cancel for a seventh item within a 30 day period: -100, Banned

Figure 8A

SOCIAL PLATFORM ECOMMERCE SYSTEM AND METHOD OF OPERATION

FIELD OF THE INVENTION

This disclosure relates to the field of electronic commerce, and more particularly to the field of online ecommerce platforms including online auctions, stores and classified advertisements integrated with and operating within a remotely accessible social platform.

BACKGROUND OF THE INVENTION

Online ecommerce including auctions have become a fixture of online activity as have social platforms including social networking and social media sites such as Facebook, LinkedIn, Twitter, You Tube and the like. Ecommerce combined with the increasing popularity of social platforms, including the increasing popularity of mobile computing, mobile blogging, micro blogging, tweeting, mobile web activity and similar mobile communication, offers buyers and sellers the possibility of finding and providing specialized goods and services, antiques, used items, and other items that can be difficult to find in conventional stores or in other online storefronts, and at the same time participate in social online and social networking activity and environments. In addition, as prices may not be fixed, negotiation within the social networking and social media environments increases the interest level of both the buyers and the sellers. Buyers have the incentive of being able to obtain some items at significant discounts to retail list prices and joining in discussion on items of interest. Sellers have the incentive that they may have a unique item that will command an above market price in the interactivity of social networking and social communication environments. The merging of ecommerce and social platforms allow users to take advantage of how they use the web and internet which is both connecting with each other through their social graph and accessing the web and internet whenever, wherever and however they want. Such an integrated environment provides both buyers and sellers with the ability to participate in philanthropic giving through such ecommerce transactions and social experiences.

Auctions offer sellers the benefit of price competition among buyers, creating markets for goods and services which are worldwide and which are becoming increasingly mobile. In addition, collectors, hobbyists and other purchasers participate in social networking activity, are drawn to ecommerce environments, and are interested in consummating transactions seamlessly without leaving a single platform. Hence a secure ecommerce environment with seamless mobile access is important and central to the social networking, social ecommerce and social selling platforms. In addition, the ability to converge and harness the power of the social environment, including buyers and sellers who actively engage in real-time communication with one another through real time blogging, micro blogging, mobile blogging, tweeting and the like, and the mobile web together would be an important and a powerful tool to sellers and buyers alike.

Ecommerce sites including online auctions have typically experienced unexpected shipping costs, particularly for international shipments and are a persistent problem for sellers and buyers alike. Thus, a need exists for the parties to such ecommerce transactions to have access to better information in advance about the real shipping costs for their items including both domestic and international shipping options.

Furthermore, the online ecommerce and social site needs to be safe for use by both buyers and sellers. Hence, the need for an improved fraud checking system providing regulated pay outs to sellers (protecting buyers from making payments before sellers are verified) and verifying the use of a credit facility by the buyers (to protect sellers from shipping goods with the possibility of not collecting good funds) is desirable.

It is desirable to provide an online ecommerce and social networking system and method that is easy for buyers and sellers to use, provides social networking capabilities including micro blogging, following, messaging and seamless communication, and easily allows a buyer to move from communicating to browsing to purchasing to payment to shipping in a secure, safe and fun environment

SUMMARY OF THE INVENTION

Provided herein are methods, systems and computer-readable medium having programming instructions stored thereon for conducting an electronic commerce transaction over a social platform or social network. Such social platforms may include social networking environments integrated with an ecommerce platform and may include buyers and sellers who actively engage in real-time communication with one another through real time announcements or blogging. Such real time announcements or blogging may also be known as micro blogging, mobile blogging, tweeting, following and the like. Such forms of communication support mobile applications through the mobile web and the social selling experience of the users, including buyers and sellers. Such methods and systems may include a selling module for implementing social selling and determining a preferred selling method or methods for a given item, a shipping module for determining the preferred method of shipping, and the cost of shipping an item from a location designated by a seller to a location designated by a buyer. Such methods, systems and computer-readable medium are socially conscious and may further include a giving application for determining a users' charitable contribution and calculating the same for providing the desired donation. A fraud checking module may also be included to check for, determine and prevent fraud by interrupting the sale and shipping process to ensure both the buyer and seller are protected during the ecommerce transaction.

A seller and buyer rating module may also be included in such methods and systems which captures, scores and posts buyer and seller activity on the site for ecommerce transactions to develop an overall rating for each buyer and seller registered with the site. Such rating may include a weighted average rating based on the amount of the transaction for a given buyer or seller, the speed of shipment by a seller, the acceptance by a seller of a returned item, the speed with which a buyer pays, the number of items returned by a buyer, cancellation of a purchase by a buyer and the number of times the buyer requests a cancellation. Types of selling may include an auction, fixed price sale or soliciting an offer from a buyer for consideration, acceptance or rejection by a seller, presenting an offer, soliciting an offer over a minimum price or soliciting an offer with no minimum price. Security is ensured through inclusion of a fraud module using velocity checking algorithms based on seller and buyer activity and weighing of a group of specific parameters and ecommerce data elements generated during the ecommerce transaction processing.

Such ecommerce data and parameters may include setting a rating range for a buyer and a seller by specific category in which the item is classified for sale, setting an allowable transaction count and an approved transaction number within a given time period. Setting a velocity of transactional activity is also included in such ecommerce data and parameters including defining a rating range, an amount allowed per transaction, the number of approved transaction within a time period and defining an interval with the time period for such permitted activity. Additional ecommerce data and parameters include providing a payout matrix for a seller based on the sellers rating on the site. Such rating determines a seller's discount rate, transaction fee, hold back percentage, hold back period, minimum payment trigger amount and maximum payout per time period cycle. Such ecommerce data may be retrieved through a communication network and a calculation module for automatically determining shipping details including shipping cost for one or more items upon conclusion of the auction, based on data from the rate engine and the retrieval application.

An exemplary method and system for conducting an electronic commerce transaction over a social platform may include creating an item having associated item data elements, storing the item data elements in a database, providing real time announcements by a seller and by a buyer over the social platform and creating data elements related to each real time announcement of the seller and the buyer for storage in the database, choosing a selling process for selling the item over the social platform from at least one of offering the item for sale at a fixed price, soliciting an offer for the item and setting an auction for the item, generating sales data elements for each chosen selling process and storing the sales data elements in the database displaying the item for sale on the social platform using the item data elements and the sales data elements for the chosen selling process. If an offer, bid or purchase is received for the item over the social platform, the seller may accept the offer, bid or purchase. If the offer, bid or purchase is accepted by the seller, the payment for the purchase will be processed for the buyer including monitoring one of the number of previous transactions by the buyer within a time interval, payments made by the buyer within a second time interval, and a third time interval between transactions by the buyer. If the payment is processed for the buyer, the payment will be presented to the seller for acceptance and include monitoring one of the number of previous transactions by the seller within a time interval, payments made by the seller within a second time interval, and a third time interval between transactions by the seller.

It will be appreciated that system modules can be constructed, programmed or otherwise created to conduct each of the required elements including those described herein in one or more exemplary embodiments. A computer-readable medium having programming instructions stored thereon for conducting electronic commerce transactions over a social platform may also be provided in one or more of the described exemplary embodiments.

It should be noted that the term "auction" is used herein to describe a situation where a seller offers goods online via a bidding process; however, it should be understood that where context permits it should be understood to further encompass other methods and transactions by which a seller offers goods or services, such as a reverse auction, or a direct online product offering, including soliciting offers for items over a minimum price or with no minimum at all. Thus the term auction should not be understood to be limiting except where context requires it.

BRIEF DESCRIPTION OF THE DRAWINGS

In order that the advantages of the invention will be readily understood, a more detailed description of the invention briefly described above will be rendered by reference to specific embodiments that are illustrated in the appended drawings. Understanding that these drawings depict only typical preferred embodiments of the invention and are not therefore to be considered to be limiting of its scope, the invention will be described and explained with additional specificity and detail through the use of the accompanying drawings, in which:

FIG. 8 is a flow diagram showing a process for a system to objectively rate a user through action on the site;

FIG. 8A is a continuation of the flow diagram of FIG. 8 showing a process for a system to objectively rate a user through action on the site;

DETAILED DESCRIPTION OF THE INVENTION

Figure 1:
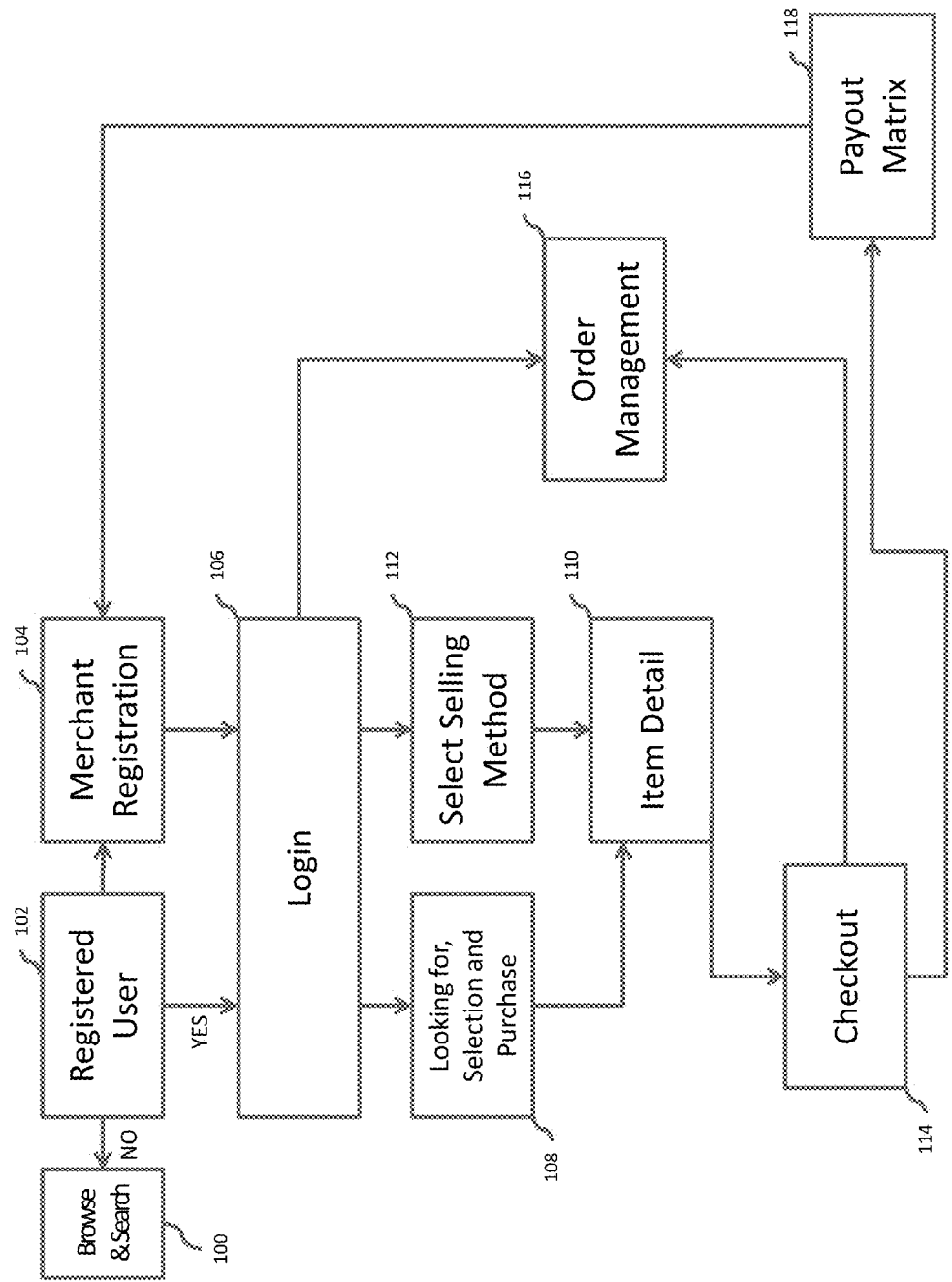
FIG. 1 is a flow diagram showing general process steps of searching the site, logging into the site, offering an item for sale, selecting an item for purchase, and managing the details of the transaction.

Referring to FIG. 1, a schematic diagram is provided depicting the general flow of the ecommerce transactions which take place within a social networking and social media site provided by the disclosed system and method. Such selling may be referred to as "social selling." As can be seen at module 100, users can browse and search the social networking and social media site to look for items to purchase, make an offer on or place a bid on at any point in time. A registered user at module 102 or a registered merchant at module 104 can login at module 106. Once logged in the user at module 102 or merchant at module 104 can search for, select and purchase an item at module 108. The item detail will be provided at module 110 and will include a method of selling at module 112.

The method of selling at 112 may include a direct purchase, soliciting an offer with or without a minimum offer price or an auction. As noted in the summary above, the term "auction" includes a forward auction where a minimum bid price is listed and the highest bidder or bidders (depending on the quantity available) win the auction. An auction may also include a reverse auction, Dutch auction or a direct online product offering, including soliciting offers for items over a minimum price or with no minimum price. When the auction is complete or the purchase is made or the offer is accepted, the buyer will identify an item for purchase from a seller and begin the checkout process at module 114. It is also contemplated that a buyer may purchase multiple items from one or more sellers and aggregate these items into a shopping cart and then begins the checkout process. The seller can monitor and obtain the status of the transaction thought the order management module at 116. When the purchase process is complete and payment is processed, the seller can then be paid through a payout process which takes place at module 118.

Users of social platforms, including social networking and social media sites, employ the social aspect of these mediums to communicate and share experiences. Businesses can use social environments to foster relationships in the social arena, build a customer base and monetize such relationships. Building a strategy around using the social platform networks will determine how a business grows it relationships through use of social networking and social media sites. The goal is to personalize a business, making it "someone" that individuals on the site can relate to. Businesses can benefit from the social platforms in expanding their face-to-face and direct rapport with their customers, allowing the business owners and executives to touch each of their customers.

Social networking and social media activity is a cost-effective way to establish relationships with customers and serves as a great source of open feedback and intelligence. Fans and followers of social networking and social media pages are more likely to buy from that seller and recommend that seller to friends and family. Electronic commerce platforms as described herein support social networking and social media marketing and advertising, drawing significant following and producing increased revenue for users of the site.

In today's online interactions, sellers continue to have a great opportunity to leverage social networking and social media in a way that is both beneficial and effective for purchasers and for sellers. An integrated social networking, social media and electronic commerce platform is critical to sellers growth, reach, repeat business and branding. Building an interactive social networking and social media community within an electronic commerce platform creates a more efficient sales environment where purchaser and customer opinions, relevant content and product information are freely distributed. It is only then that "social commerce" truly happens. To accomplish "social commerce," retailers must be able to integrate social elements, such as social networking features, social media features and user generated content platforms, directly into their electronic commerce environments.

Through integration of a social platform, including networking/social media platforms, with a safe and effective electronic commerce platform, merchants and sellers can create and own a unique social experience that encompasses the entire customer lifecycle—generating a positive outcome for the sellers and for purchasers. Purchasers can enjoy a more integrated shopping experience that stretches across their social networks, and sellers will start to see an increase in unique visitors that are predisposed to their messages. Such a complete system results in more streamlined marketing efforts, regular use by both sellers and purchasers, and lower operational costs.

Instead of selling to nameless, faceless shoppers, businesses can build relationships with real customers by enabling them to establish user profiles that attract relationships to seller sites and profiles providing valuable data that cannot be obtained as easily and as freely, in any other way. Purchasers can interact with other shoppers, join groups centered on product-related topics, rate and react to product content, contribute project journals and how-to content, and answer each others' questions about products, including reviews of such items, increasing the value of the social interactions. The sellers at the same time gain the opportunity to build a long-term relationship, resulting in a repeat purchaser and a social purchaser relationship around these efforts.

As the online world continues to evolve and become more competitive, merging electronic commerce with social platforms is critical for sales success and increased revenue generation. "Social commerce" integrates new media, through user generated content platforms, social media and social networking features, with electronic commerce. By building and maintaining vibrant communities that address the passion of the sellers' core audience, and then spreading that passion to the larger social web including the mobile web, sellers will attract loyal and engaged customers, and will achieve better business results with increased traffic generating increased revenue.

Figure 2:
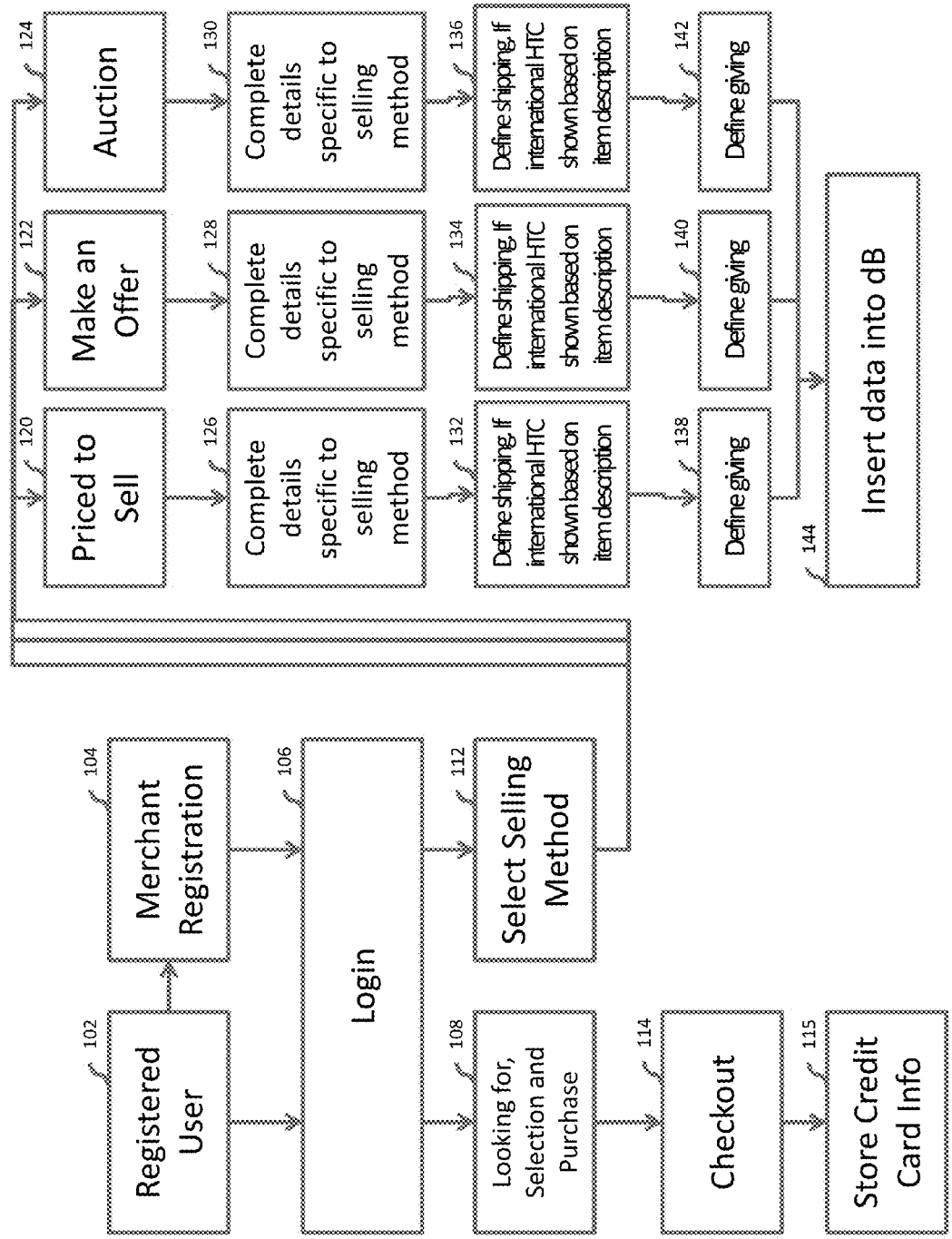
FIG. 2 is a flow diagram showing process steps for the various methods of selling on the site.

Referring to FIG. 2, one embodiment of an ecommerce marketplace on the social media site is illustrated. The combination of the social platform site and ecommerce platform includes a registered user at module 102 and a registered merchant at module 104 login at module 106 as described above. Once logged in the user at module 102 or merchant at module 104 can search for, select and purchase an item at module 108. Upon purchase, the checkout process continues at 114 and includes the processing of a credit card or other payment method at 115. As described above, the method of selling at 112 may include a direct purchase at module 120, soliciting an offer with or without a minimum offer price at module 122 or an auction of any type described above at module 124. The item detail illustrated in FIG. 1 includes the details specific to a specific selling method as shown at module 126 for a direct purchase of an item shown at module 120, at module 128 for a soliciting an offer with or without a minimum offer price shown at module 122, or at module 130 for an auction of any type described above shown at module 124. Each of these selling methods 120, 122, 124 and their details 126, 128, 130 include specific information added at modules 132, 134 and 136 providing necessary codes including zip codes, country codes and harmonization tariff codes based on the item description. In addition, each selling method may include the ability of the seller to designate a certain portion of the sale to be donated to a charity by defining giving portions at modules 138, 140 and 142. Upon completion of the item creation and listing process, the item details are added to a global data base of items available for sale at module 144.

Figure 3:
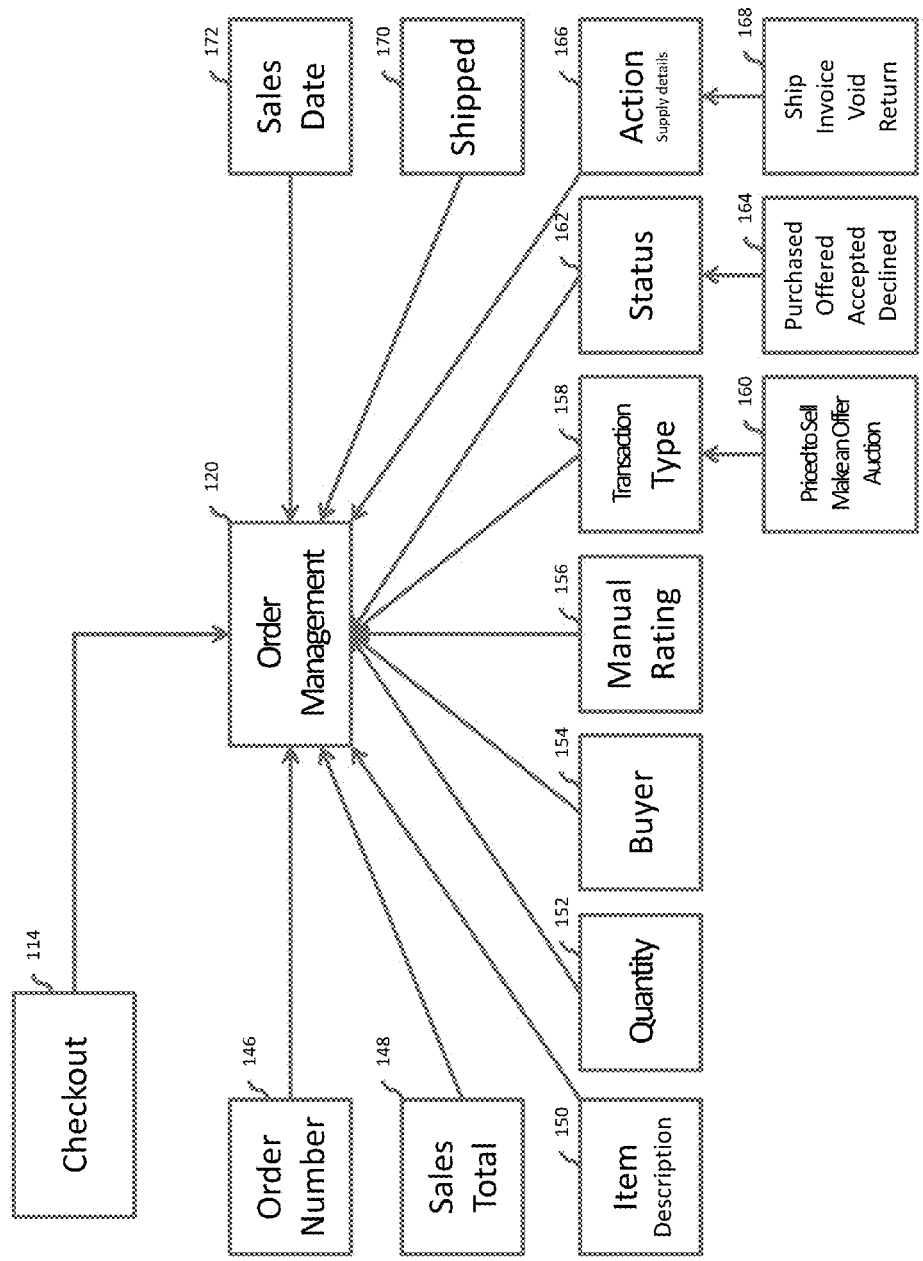
FIG. 3 is a flow diagram showing a process for managing transactions on the site.

As shown in FIG. 3, the order management details to be included in each listing as shown at module 126, 128 and 130 are all required to complete the order management process at module 116 and ultimately check out module 114. Such details include the order number 146 which identifies the specific order in the system. The total sale price is included at 148 and provides the total for all items purchased and aggregated in the shopping cart for the user 112 or merchant 114. For each item purchased the details of the order will include the item description 150 and the quantity of each item purchased 152. Each transaction will include the specific buyer details 154, the rating of the buyer 156 and the type of transaction that the buyer completed at 158, namely direct purchase 120, an offer 122 or an auction 124 at module 160. In addition, the particular status of the transaction will be identified at 162. Specifically, the status will be identified at module 164 as purchased if the transaction completed is a direct purchase 120 or the winning bid on an auction 124. The status of the transaction at 164 will be "offered" if there is a pending offer for an item made by a potential purchaser at 122 which has not yet responded to by the merchant seller. The status of the transaction at 164 will be "accepted" when the seller merchant or the purchaser accepts the current offer. The status of the transaction at 164 will be "declined" when the merchant seller or the potential purchaser declines an offer at any point in the process. Finally, the status of the transaction will be "purchased" when the merchant seller or purchaser accepts the pending offer. At that point in the process at 164, the next processing step will change the status of the transaction to "purchase." The current status at 164 will be transmitted to the current status at 162 and then to the order management module at 116.

When the transaction becomes a purchase, additional details for the transaction are required at 166. For all purchases regardless of the selling method the following details of the transaction will be captured and transmitted to the system at 168: the shipping method, invoice identification (including the name of the purchaser, address, payment method and the like), whether the transaction is voided for any reason during processing, and if the transaction required a return of an item purchased. These details will be provided to order management at 116. When the order is shipped, such will be indicated to order management 116 at 170. For each purchase, the sales date will be captured based on the date of payment at 172 and provided to order management 116.

Figure 4:
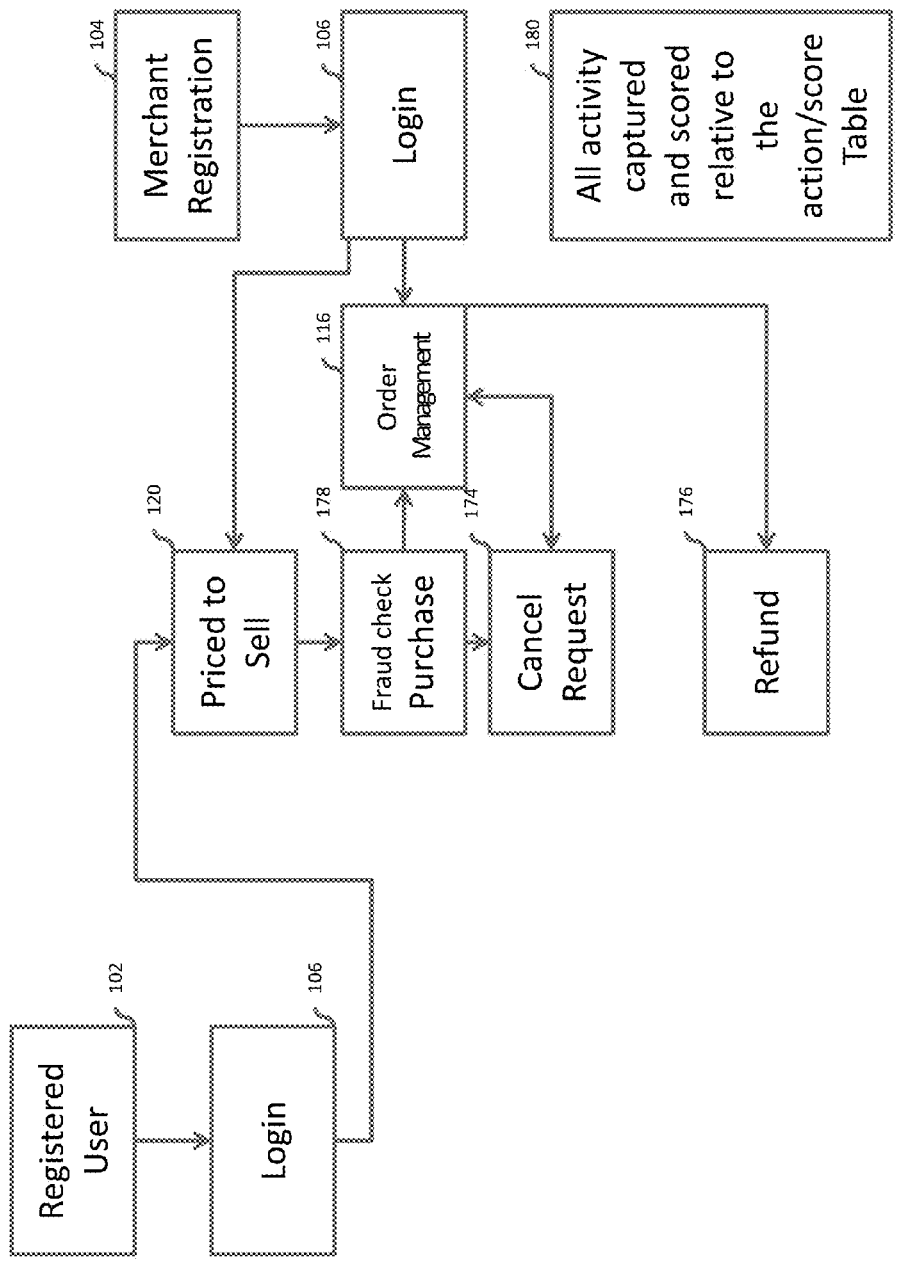
FIG. 4 is a flow diagram showing a process for conducting and concluding a direct sale on the site including fraud check and order management activities.

Referring to FIG. 4, a direct purchase 120, as also shown in FIG. 1, includes a registered user login at 102, 106 and/or a merchant login at 104, 106. When a purchase is made by user 102, the order management details as described above are retrieved from the system database corresponding to the individual merchant seller including the item details from the system database at 116. As described above, this includes the item details that are matched with the transaction details, and a purchase is created and updated in the purchase details to create a purchase record that is then stored in the system database at 116. After such details are processed, the system checks to determine if any cancellation request has been received after the purchase was updated and entered into the system database at 174. If such a cancellation request was received and payment had been previously made, a refund request is processed at 176.

The system and method disclosed also provide the real time checking for fraud at 178 to prevent a sale which was conducted under fraudulent terms. Such fraudulent sales may occur through improper use of a credit card or other credit facility which was wrongfully obtained by the user. Such fraudulent use of improperly obtained credit cards or other credit facilities are recognized by the specific properties of such use and the manner in which such credit cards and credit facilities are used over the internet and while using social networking and social media and other sites which process transactions for purchases of commodities. Details of such types of fraudulent transactions and their characteristics are described in further detail below.

The system also provides a rating system of all users to provide a safe and secure transaction environment. Such a rating system captures the details of all activity of each user for each transaction and translates such activity to a user rating which follows the user through his tenure on the site. All of the details of such transactional activity on the site are stored in the system data base for use by the system in rating each user and seller merchant at module 180. It will also be appreciated that the purchaser may designate a giving amount as a donation to a charity during the purchase at 178.

Figure 5:
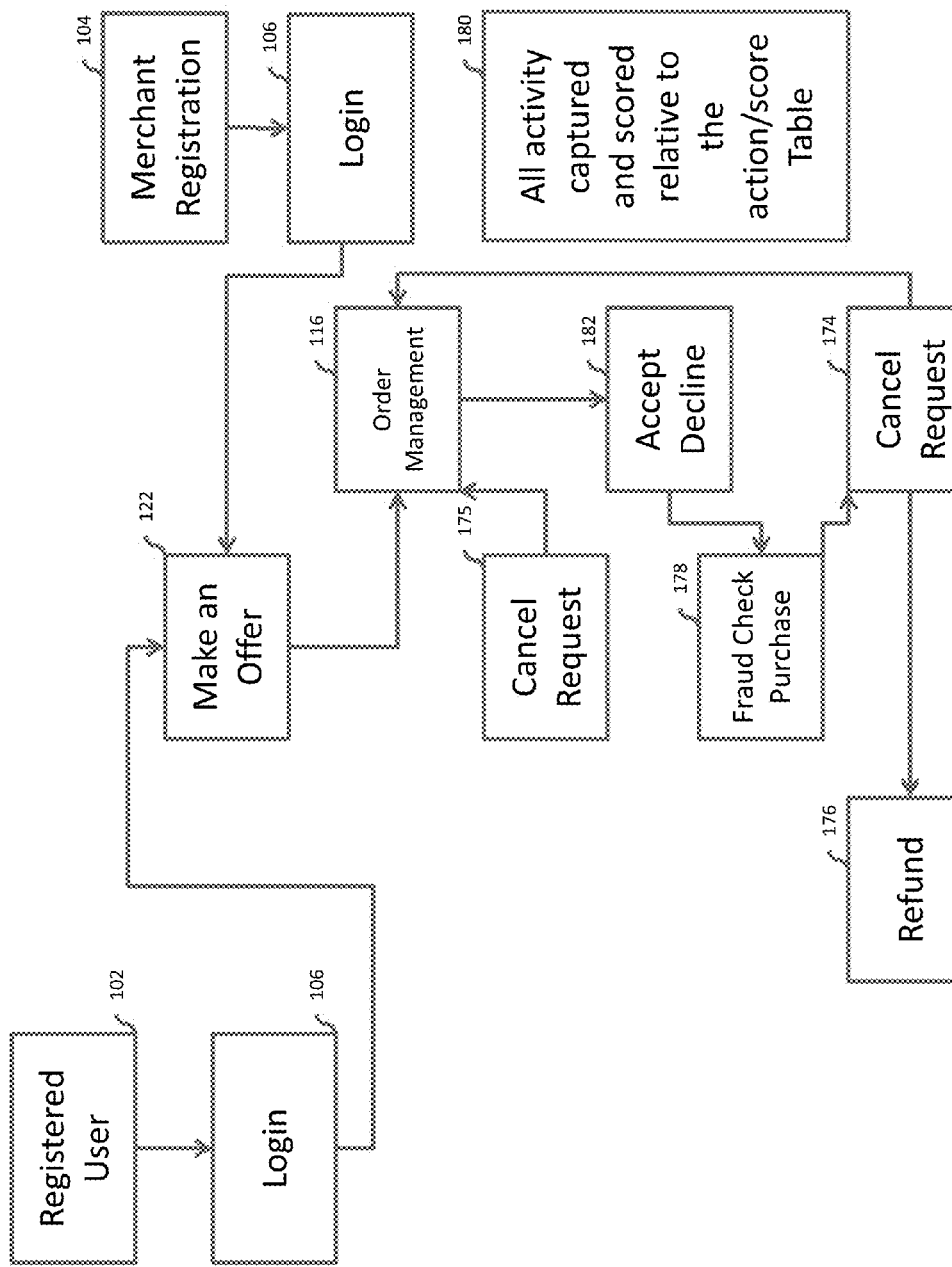
FIG. 5 is a flow diagram showing a process for conducting and concluding a sale made based on the acceptance of an offer on the site including fraud check and order management activities.

Solicitation of an offer with or without a minimum offer price, as shown in FIG. 1, is illustrated in further detail in FIG. 5. The offer process includes a registered user login at 102, 106 and/or a merchant login at 104, 106. When the offer is presented at 122, the order management details as described above are updated in the system database corresponding to the individual merchant seller details for the subject item at 116. The offer may be canceled before it is accepted or declined at module 175. If the offer is not canceled, then the offer is either accepted, declined or a counter-offer is made at 182. The details associated with the acceptance, declination or counter-offer are updated in the system database corresponding to the merchant seller and subject item in the order management process at 116. When an offer is accepted, a purchase is made by user 102 and the order management details as described above are retrieved from the system database corresponding to the individual merchant seller including the item details from the system database at 116. As noted above, the purchaser may also designate a giving amount as a donation to a charity during the purchase at 178.

As described above, when a purchase is completed, the item details are matched with the transaction details, and a purchase is created and updated in the purchase details to create a purchase record that is then stored in the system database at 116. After such details are processed, the system checks to determine if any cancellation request has been received after the purchase was updated and entered into the system database at 174. If such a cancellation request was received and payment had been previously made, a refund request is processed at 176. As described above, the system engages in real time checking for fraud at 178 to prevent a sale which was conducted under fraudulent terms. As noted above, details of such types of fraudulent transactions and their characteristics are described in further detail below. All of the details of such transactional activity on the site are stored in the system data base for use by the system in rating each user and seller merchant at module 180.

Figure 6:
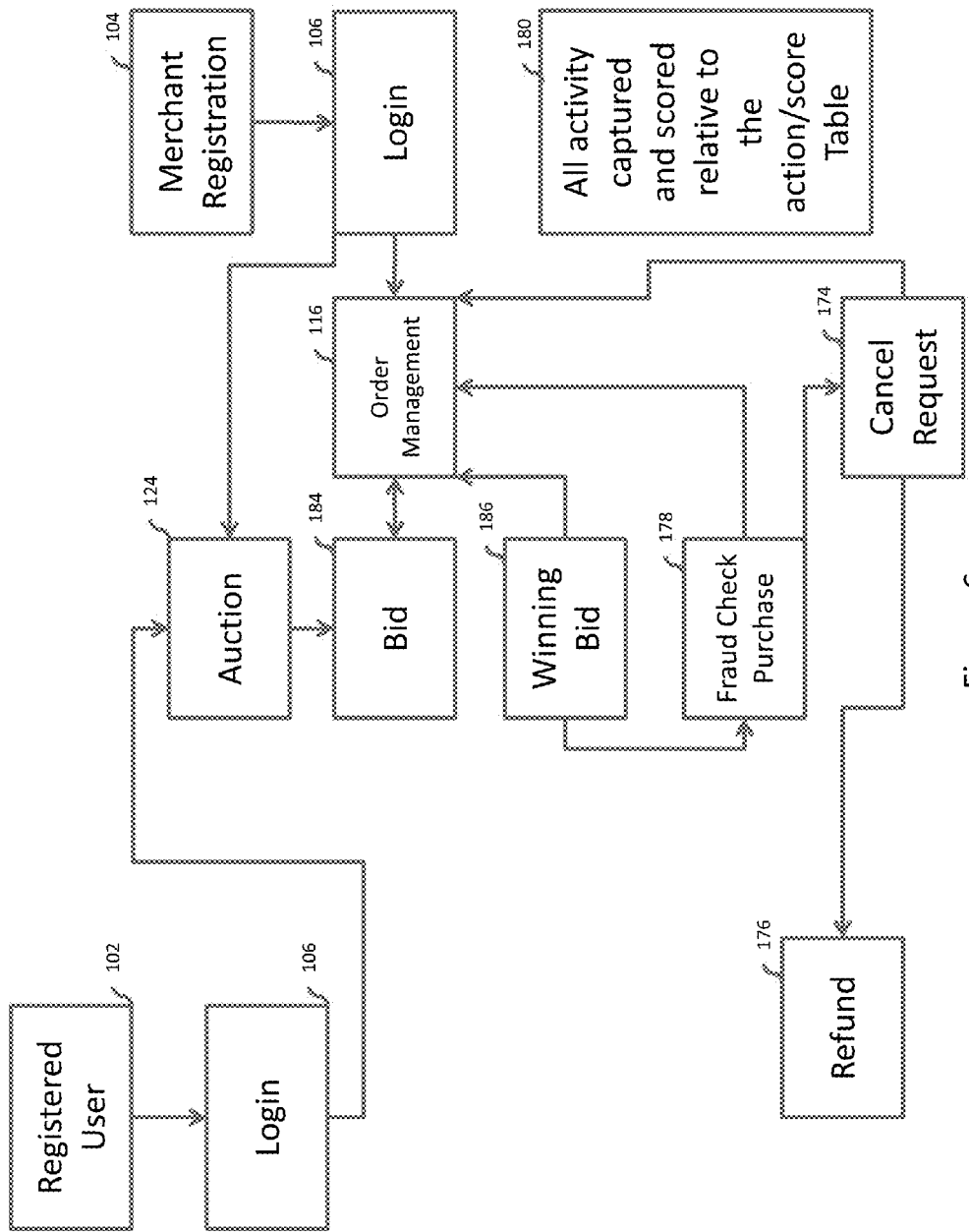
FIG. 6 is a flow diagram showing a process for conducting and concluding a sale made through an auction event on the site including fraud check and order management activities.

As shown in FIGS. 1 and 6, an auction at 124 includes a registered user login at 102, 106 and/or a merchant login at 104, 106. An auction may include one or more bids which are received by the system at 184 and are updates by order management on a real time basis at 116. The auction may complete with one or more winning bids being received at 186 and updated by order management at 116. In the alternative, if a winning bid is not obtained, the auction will not end in a purchase and the item will become available through an update by order management at 116 for a subsequent sale through one or more of the available selling methods including a direct purchase at 120, an offer for sale at 122 or another action at 124. If the auction ends in a winning bid, the highest bidder(s) will be able to purchase the item(s). If a purchase is made by a winning bidder which may be user 102, the order management details as described above are retrieved from the system database corresponding to the individual merchant seller including the item details from the system database at 116.

As described above, when a purchase is completed, the item details are matched with the transaction details, and a purchase is created and updated in the purchase details to create a purchase record that is then stored in the system database through order management at 116. After such details are processed, the system checks to determine if any cancellation request has been received after the purchase was updated and entered into the system database at 174. If such a cancellation request was received and payment had been previously made, a refund request is processed at 176. As described above, the system engages in real time checking for fraud at 178 to prevent a sale which was conducted under fraudulent terms. As noted above, details of such types of fraudulent transactions and their characteristics are described in further detail below. All of the details of such transactional activity on the social platform site are stored in the system data base for use by the system in rating each user and seller merchant at module 180. Again, the purchaser may also designate a giving amount as a donation to a charity during the purchase at 178.

Figure 7:
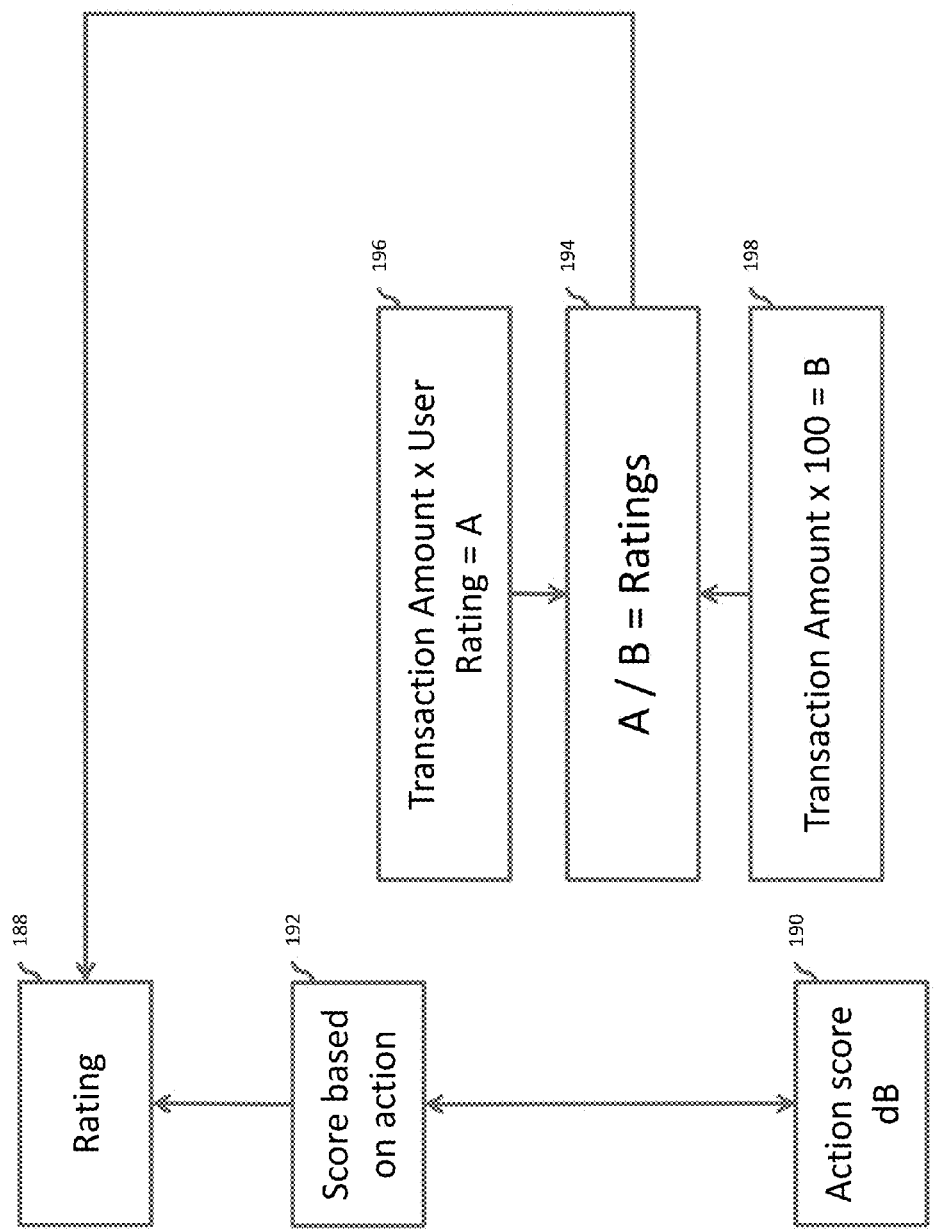
FIG. 7 is a flow diagram showing a process for a system to objectively rate a user using the site.

As illustrated in FIG. 7, the overall user rating particular to the systems and methods disclosed herein include components based on the action and behavior of the user on the social platform site (shown in FIG. 3 at 166, 168) and a weighted manual rating component (shown on FIG. 3 at 156) based on the transaction amount and the current user rating. As can be seen in FIG. 7, a user 102 or merchant 104 may have a corresponding rating 188. Rating 188 may be made up of components from prior activity on the site from an action score database 190. The prior action score from the database at 190 is combined with the score for the current transaction and activity on the social platform site at 192 to obtain the action component 166 (FIG. 3) of rating 188.

Each transaction the user 102 or merchant 104 engages in on the social platform site is rated at 194 forming a weighted manual component of rating 188. The weighted manual component 194 is made up of the transaction amount for the current transaction multiplied by the current user rating. This product A at 196 forms the numerator of the weighted manual component 194. The denominator of the weighted manual component 194 is the transaction amount multiplied by 100 at 198. This product B at 198 forms the denominator of the weighted manual component 194. The result of A over B at 194 is the weighted manual component 194 of the rating at 188.

As can be seen in FIGS. 7, 8 and 8A, the prior action score from database 190 is determined from merchant or seller 104 actions including how quickly the seller ships an item or when the seller accepts return of an item. One-half of a point is added to the seller's rating if the seller ships an item within one business day after a purchase is made by a buyer 102. If a seller ships an item within two business days from receiving a purchase, three tenths of a point will be added to his merchant rating. If a seller ships an item within three business days from receiving a purchase, one tenth of a point will be added to his merchant rating. If a seller ships an item after three business days from receiving a purchase, three points will be deducted from his merchant rating. In each instance a seller accepts return of an item, two tenths of a point will be added to his merchant rating.

The prior action score from database 190 is determined from user or buyer 102 actions, including the speed with which the user or buyer pays for an item purchased or won.

Credit of one point is provided if the buyer pays with in a six hour time period, one-half a point if the buyer pays within a twelve hour time period, three tenths of a point if the buyer pays within a twenty four hour period, two tenths of a point if the buyer pays within a two day period and one tenth of a point if the buyer pays within a three day period.

If the buyer does not pay within a three day period, five points is deducted from the buyer's rating. If the buyer does not pay within three days for a second item, ten points is deducted from the buyer's rating. If the buyer does not pay within three days for a third item, twenty points is deducted from the buyer's rating. If the buyer does not pay within three days for a fourth item, forty points is deducted from the buyer's rating. Finally, if the buyer does not pay within three days for a fifth item, one hundred points is deducted from the buyer's rating and the buyer is banned from the site. If a buyer requests to return an item within a thirty day time period, one tenth of a point will be deducted from the buyer's rating. If a buyer requests to return a second item within a fourteen day time period, three tenths of a point will be deducted from the buyer's rating. If a buyer requests to return a second item within a seven day time period, five tenths of a point will be deducted from the buyer's rating.

Similarly, if a buyer requests to return a third item within a thirty day time period, one point will be deducted from the buyer's rating. If a buyer requests to return a third item within a fourteen day time period, two points will be deducted from the buyer's rating. If a buyer requests to return a third item within a seven day time period, three points will be deducted from the buyer's rating. If a buyer requests to return a fourth item within a thirty day time period, two points will be deducted from the buyer's rating. If a buyer requests to return a fourth item within a fourteen day time period, five points will be deducted from the buyer's rating. If a buyer requests to return a fourth item within a seven day time period, ten points will be deducted from the buyer's rating. If a buyer requests to return a fifth item within a thirty day time period, ten points will be deducted from the buyer's rating. If a buyer requests to return a fifth item within a fourteen day time period, thirty points will be deducted from the buyer's rating. If a buyer requests to return a fifth item within a seven day time period, fifty points will be deducted from the buyer's rating. If a buyer requests to return a sixth item within a thirty day time period, thirty points will be deducted from the buyer's rating. If a buyer requests to return a sixth item within a fourteen day time period, fifty points will be deducted from the buyer's rating. If a buyer requests to return a sixth item within a seven day time period, one hundred points will be deducted from the buyer's rating and the buyer will be banned from the site. If a buyer requests to return a seventh item within a thirty day time period, one hundred points will be deducted from the buyer's rating and the buyer will be banned from the site. If a buyer requests to return a seventh item within a fourteen day time period, one hundred points will be deducted from the buyer's rating and the buyer will be banned from the site.

If the buyer requests cancellation of a purchase within one day, five tenths of a point will be deducted from the buyer's rating, if the buyer requests cancellation of a purchase within two days, one point will be deducted from the buyer's rating. If the buyer requests cancellation of a purchase within three days, three points will be deducted from the buyer's rating. If the buyer requests cancellation of a second purchase within a thirty day period, one point will be deducted from the buyer's rating. If the buyer requests cancellation of a second purchase within fourteen days, three points will be deducted from the buyer's rating. If the buyer requests cancellation of a second purchase within seven days, five points will be deducted from the buyer's rating. If the buyer requests cancellation of a third purchase within a thirty day period, three points will be deducted from the buyer's rating. If the buyer requests cancellation of a third purchase within fourteen days, seven points will be deducted from the buyer's rating. If the buyer requests cancellation of a third purchase within seven days, ten points will be deducted from the buyer's rating. If the buyer requests cancellation of a fourth purchase within a thirty day period, ten points will be deducted from the buyer's rating. If the buyer requests cancellation of a fourth purchase within fourteen days, thirty points will be deducted from the buyer's rating. If the buyer requests cancellation of a fourth purchase within seven days, fifty points will be deducted from the buyer's rating. If a buyer requests cancellation of a fifth purchase within a thirty day time period, thirty points will be deducted from the buyer's rating. If a buyer requests cancellation of a fifth purchase within a fourteen day time period, fifty points will be deducted from the buyer's rating. If a buyer requests cancellation of a fifth purchase within a seven day time period, one hundred points will be deducted from the buyer's rating and the buyer will be banned from the site. If a buyer requests cancellation of a sixth purchase within a thirty day time period, fifty points will be deducted from the buyer's rating. If a buyer requests cancellation of a sixth purchase within a fourteen day time period, one hundred points will be deducted from the buyer's rating and the buyer will be banned from the site. If a buyer requests cancellation of a seventh purchase within a thirty day time period, one hundred points will be deducted from the buyer's rating and the buyer will be banned from the site.

Figure 9:
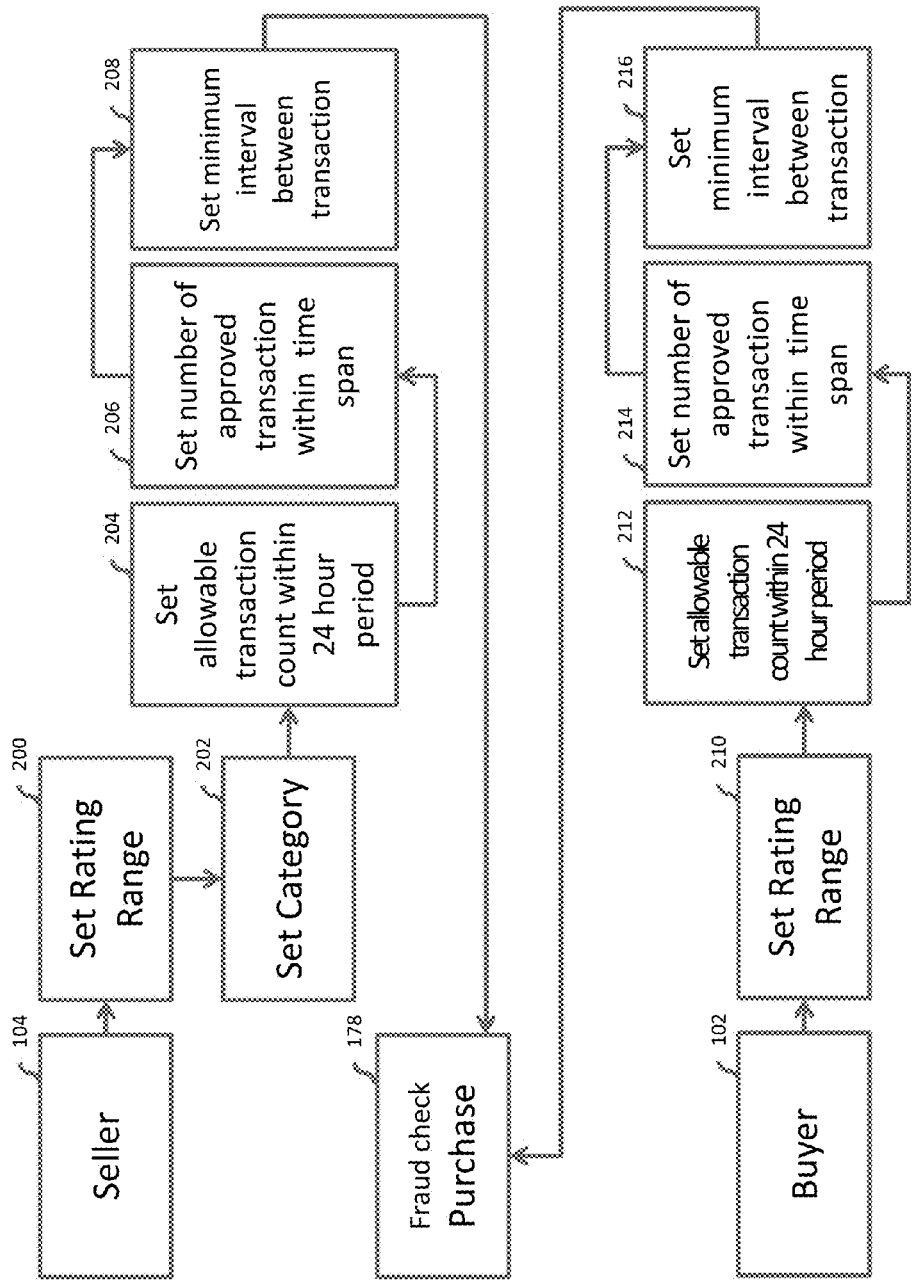
FIG. 9 is a flow diagram showing a process for a system to check for fraudulent sale or purchase activity on the site.
Figure 10:
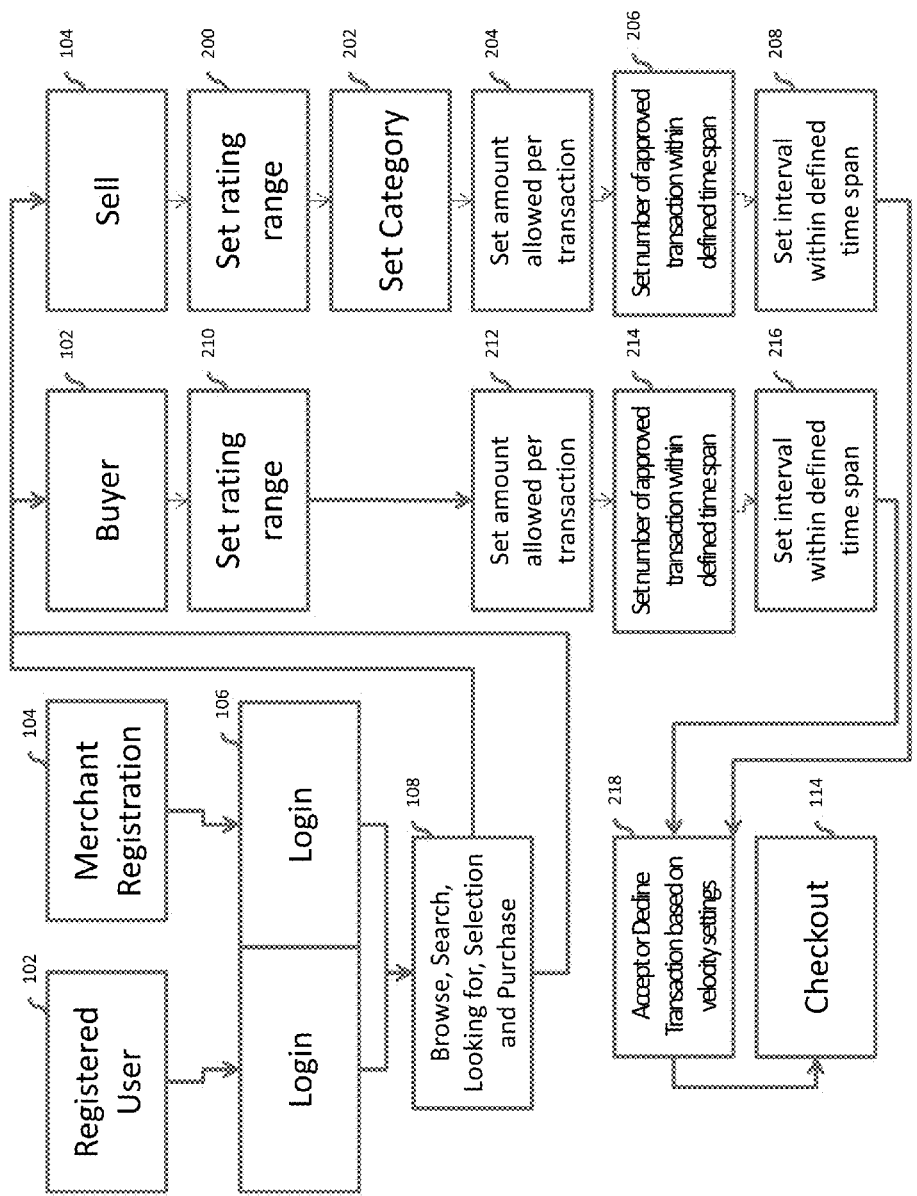
FIG. 10 is a flow diagram showing a process for a system to check for fraudulent sale or purchase activity on the site including velocity checking.

Another preferred embodiment of the social platform ecommerce system and method disclosed herein includes providing a safe and secure transaction environment. As can be seen in FIGS. 9 and 10, a velocity and fraud check algorithm is contemplated to be performed for each user/purchaser/buyer 102 and merchant/seller 104 based on a number of velocity counts over a specific period of time. The algorithm generates a combination of velocity counts to provide a fraud check of the buyer 102 and the seller 104 for each site transaction. Referring to FIG. 9, as an example of a preferred embodiment, a range is set for a specific seller 104 based on his history on the site at module 200. The seller rating range is then further determined through the category in which the product or item is being sold at module 202. For the specific combination of the seller rating range 200 and specific category now set at 202, the allowable transaction count for the previous 24 hour period is then set at module 204. The number of approved financial transactions within a given time period are also set at module 206 along with the minimum amount of time between the current transaction and previous transaction determined at module 208. This combination of variables set at modules 200, 202, 204, 206 and 208 are used to determine whether a given seller's transaction will be approved and allowed to be completed by the social platform site at 178. Such velocity checking protects the buyers 102 on the site to be sure that they are dealing with sellers who do not conduct themselves in a manner know to be associated with fraudulent ecommerce activity and transactions.

Similar velocity checking is performed by the social platform site and ecommerce platform for each buyer/purchaser 102 who engages in a transaction on the site. A range for the specific buyer 102 is set at module 210 based on the buyer's history on the site. For the specific combination of the buyer rating range set at 210, the allowable transaction count for the previous 24 hour period is them set at module 212. The number of approved financial transactions within a given time period are also set at module 214 along with the minimum amount of time between the current transaction and previous transaction determined at module 216. This combination of variables set at modules 210, 212, 214, and 216 are used to determine whether a given buyer's transaction will be approved and allowed to be completed by the social platform site at 178. Such velocity checking protects the sellers 104 on the site to confirm that each seller is dealing with a buyer who does not conduct themselves in a manner know to be associated with fraudulent ecommerce activity and transactions, including the identification of the use of a potentially stolen credit card or other stolen credit facility.

Figure 9A:
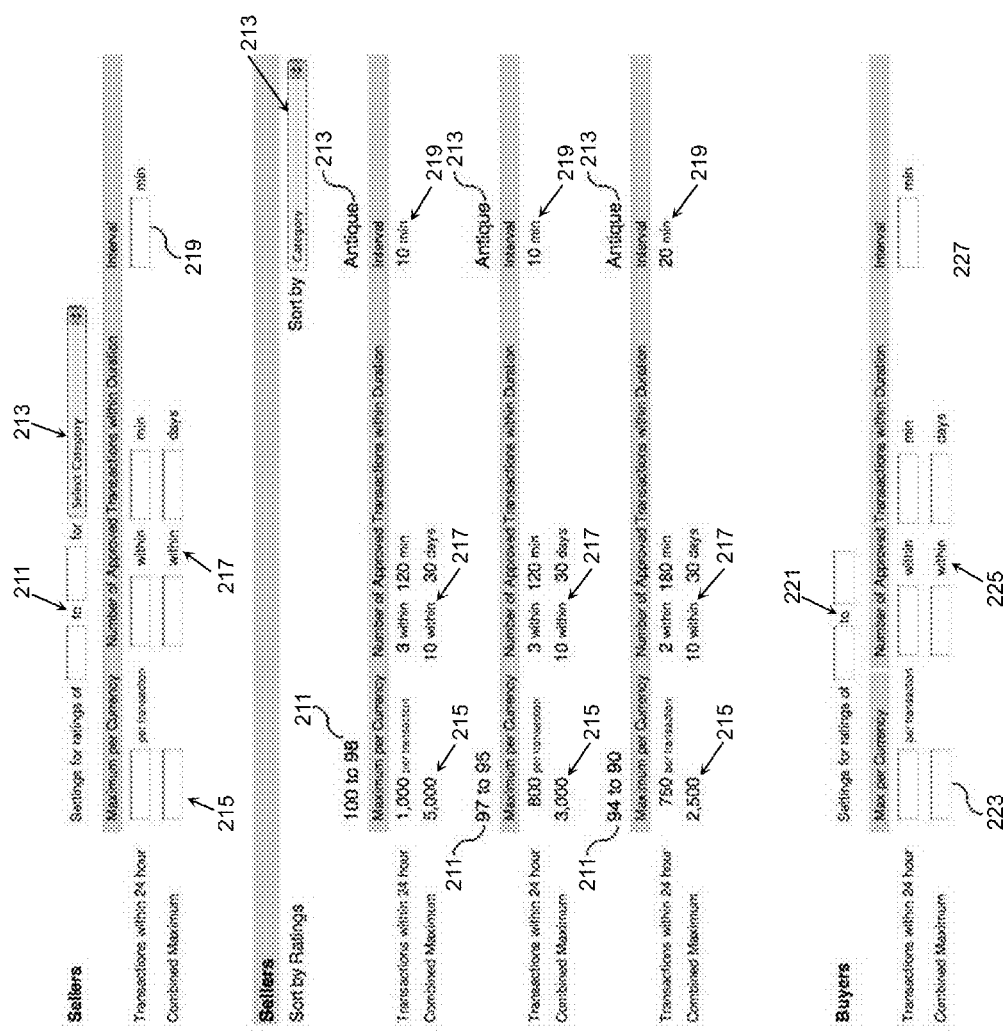
FIG. 9A is an exemplary layout of an administration site page showing the parameters to be set to implement a process to check for a fraudulent sale or purchase on the site.

It will be understood that the time duration between transactions or groups of transactions can vary and multiple time intervals can be used in the velocity check algorithm to create the desired velocity checking process. All intervals included in the algorithm may be set by the site administrator as shown in FIGS. 9, 9A and 10 for sellers and buyers within a given rating range. It will be appreciated that these rating ranges can vary and be changed by the site administrator for the most efficient operation of the site and to accomplish site security as required by the site operating parameters, conditions and the like. In a preferred embodiment as shown in FIG. 9A, the rating range 211 for sellers is set for each category or subcategory at 213 as required at 200. The maximum amount of each transaction 215 for a specific seller rating range is set as required at 204. In addition, the number of approved transactions within a specific time interval 217 is set as required at 206. The minimum time interval between approved transactions for a given category and seller rating range 219 is set as required at 208. As can be seen for the illustrated embodiment in FIG. 9A, for a seller rating range of 100 to 98, the maximum amount of a single transaction is $1000.00, and not more than 3 approved transactions can occur within a 120 minute interval with no less than 10 minutes between transactions. In addition, for the seller rating of 100 to 98, no more than a total of $5000.00 in transactions can be completed within a twenty four hour period and no more than 10 transactions can be completed within a 30 day period.

The rating range for the buyer 221 is set as required at 210. The maximum amount of each transaction 223 for a specific buyer rating range is set as required at 212. In addition, the number of approved transactions within a specific time interval 225 is set as required at 214. The minimum time interval between approved transactions for a given category and buyer rating range 227 is set as required at 216. If the requirements of these algorithms are not met, the transaction cannot proceed to checkout at 114 to be completed. Instead the transaction fails and the item in placed back into the seller's available inventory.

As illustrated in FIG. 10, upon login at module 106, user/buyer 102 and merchant/seller 104 move to complete a transaction at 108 after browsing searching selecting and moving an item into a purchasing status. Prior to completing checkout at 114, the velocity fraud checking sequence is conducted for a purchasing buyer by setting the rating range at 210, setting the amount allowed for the transaction at 212, setting the number of approved transactions within a defined time period at 214 and setting the allowed interval of purchases within the defined time span at 216, the combination of which determine if the transaction is fraudulent or not and whether the transaction is accepted or declined at 218. If the transaction is accepted at 218 then it can proceed to checkout and payment processing at module 114.

As shown in FIG. 10 the velocity fraud checking sequence is conducted for a seller by setting the rating range at 200, setting the specific category in which the item was sold from at 202, setting the amount allowed for the transaction at 204, setting the number of approved transactions within a defined time period at 206 and setting the allowed interval of purchases within the defined time span at 208, the combination of which determine if the transaction is fraudulent or not and whether the transaction is accepted or declined at 218. If the transaction is accepted at 218 then it can proceed to checkout and payment processing at module 114. Accordingly, if either the seller velocity check or the purchasing buyer velocity check is not passed, the transaction will be declined at 218 and will not be allowed to proceed to checkout at 114.

Figure 11:
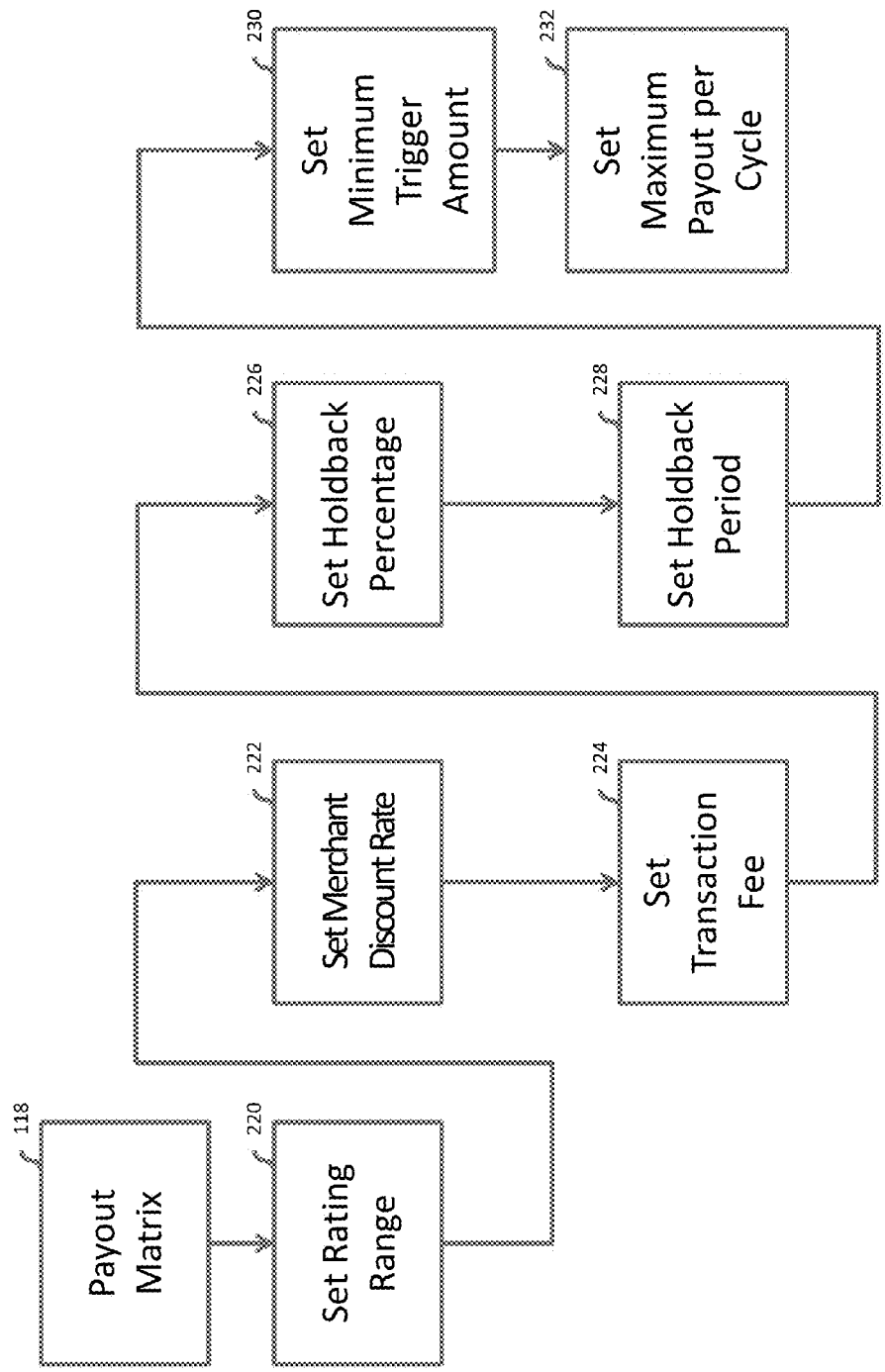
FIG. 11 is a flow diagram showing a process for a system to control the payout to the seller of funds collected through site transactions.

Another preferred embodiment of the social platform ecommerce system and method disclosed herein, as illustrated in FIG. 11, includes providing a payout algorithm to provide collected funds to the site sellers. A payout matrix is set at module 118 which sets a rating range for specific sellers on the social platform site at 220. The rating range is set by the site administrator and provides set parameters for a given range of sellers based on their overall rating on the site as discussed above and illustrated in FIGS. 7, 8 and 8A. For a given range of seller ratings at 220, the payout matrix sets a merchant/seller discount rate at module 222, sets a transaction fee rate at module 224, sets a percentage that will be held back with each payout at module 226, sets the length of the hold back period in days at module 228, sets a minimum trigger amount at which a payout will be provided to a given seller rating range at 230 and sets a maximum amount that will be paid in each payout generated for a given seller rating range at 232. These parameters can be modified for a given seller rating range by the site administrator and will apply to all sellers that fall into the defined rating range at the time of site payout. It will be appreciated that typically a site payout will occur each day and will be run as a batch process by the site administrator or will be set to run automatically at a set time each day. The payout process will transmit payment to the account on file for each seller based on the transactions that have processed through the social platform ecommerce system since the last payout process was completed.

Figure 12:
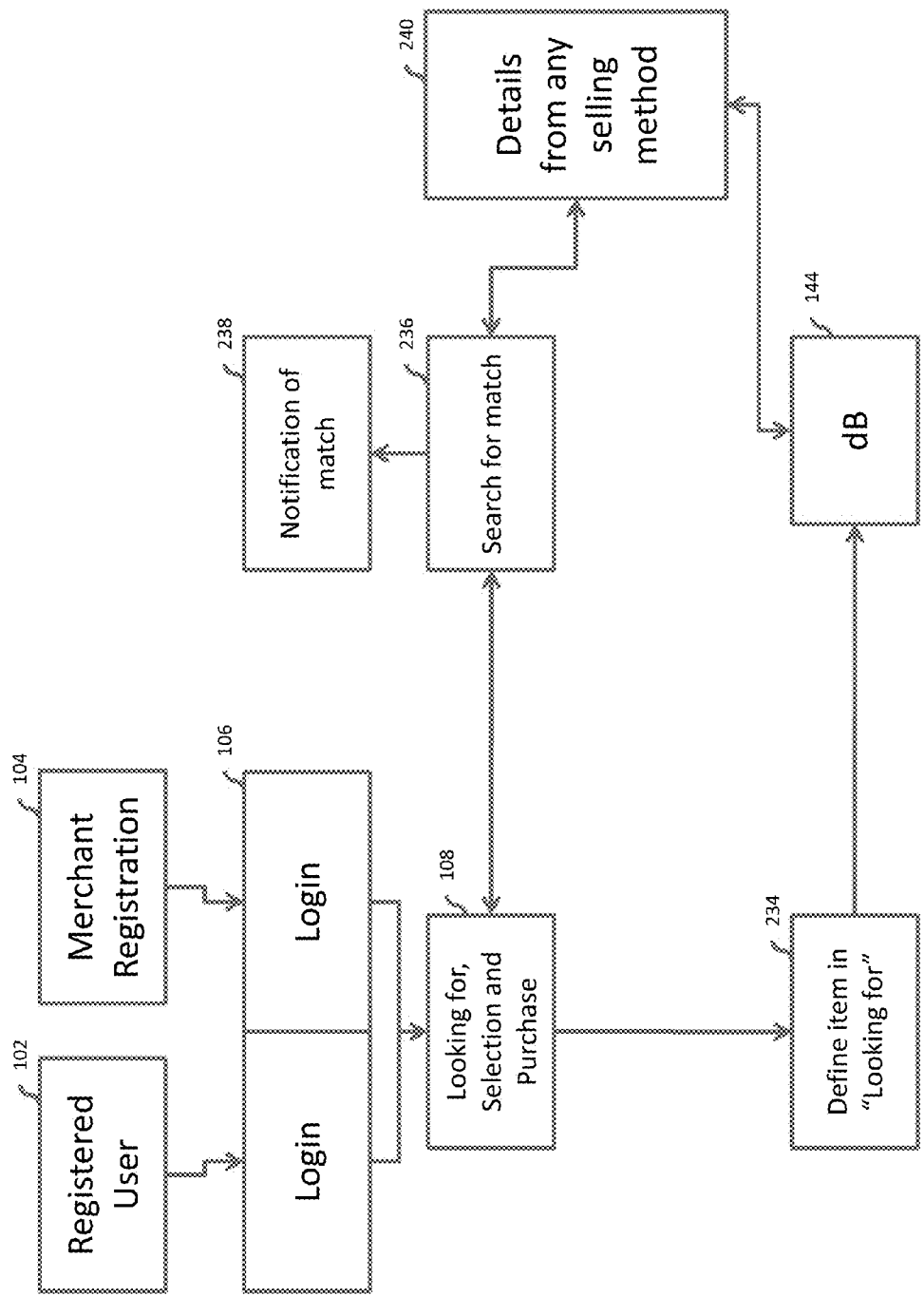
FIG. 12 is a flow diagram showing a process for a system to initiate, store and recall items of interest by a user on the site.

In another preferred embodiment illustrated in FIG. 12, the social platform ecommerce system and method includes a feature which allows a user to identify specific items the user has an interest in which will be followed by the user on the site. Such following by a user may lead to a subsequent purchase on the site. Upon login at module 106, a user 102 or a merchant 104 can associate certain criteria at module 108 including search words, price range, classification, location and other parameters with his user login credentials which are set at module 234. At that time these criteria will be searched through the social platform site search engine at module 236 and the results which meet the criteria set by the user 102 or merchant 104 will be returned to the user's or merchant's profile on the site at module 238. The user or merchant will be able to see the search results in real time upon login to the site which are recalled by the search from the site data base 144. Such search will include all details from all methods of selling as illustrated at module 240.

One or more alternate alerts can be set by the user providing email notification, phone notification, test messaging notification, tweet notification, feed notification including RSS feeds, email feeds, social site feeds and the like, site update notification or other type of user notice that an item has appeared on the site that meets the search criteria previously set by the user or merchant. Such notification will be useful to notify a buyer of a desired item that had recently been added to the site, notify a merchant that a seller has added an item that may be of interest to the merchant for competitive reasons, pricing guidelines, to add to a collection or other inventory of a merchant using the site and its features, or for any of a number of reasons of interest.

As may be appreciated by those skilled in the art, the social platform ecommerce system and method includes a group of interrelated databases and database tables. Such tables provide for the storage and retrieval of data regarding system operation, system activities including routines and sub-routines to be performed on data dynamically as the site is updated by users, including creating, updating and modifying messages, listings, bids, offers, purchases, security operations, shipping operations, advertising on the site and other site activity. Such databases and associated data tables may include one or more of the following inter-relational data elements: placing and managing advertisements on the site, capturing and archiving bid and offer data, user data including billing data detail, category data table for categorizing and listing items on the site, emails and templates generated by the system and sent through the system including alerts, email messaging and other notifications from the site, frequently asked questions and answers, sales and fees collected by the site, following and follower user activities on the site, charitable giving including identification of donations, causes, transmittal of donations, capturing and archiving item data, including details necessary to describe, comment on, list and sell items on the site, capturing payment details of all items sold and returned on the site, search, selection, viewing, tracking and looking for items on the site, capturing offers made by sellers including counter offers, capturing details on registered sellers/merchants including bank, credit card, promotional codes, capturing payment details and tax rates, charges and payments, payment gateway activity for multiple processing entities, payout specifics and tracking of the same, rating buyers and sellers, management of buyer and seller ratings and rules, tracking seller return policies, shipments, pending shipments and shipping details, static page management, store information customized listing pages including designs, system configurations, stored search results, buyer and seller transactional velocity settings, site management and site security.

The use and design of a preferred embodiment of the system, method and computer code disclosed herein will now be described in more detail through the use of exemplary screens which may be used on a site including the social platform and ecommerce system described herein. It should be understood that the screen displays illustrated are only exemplary, that the screens can be formatted in a variety of layouts and may include a variety of data fields and design elements, and that the data tables described herein are updated as necessary to provide efficient operation of the embodiments of system, method and computer code disclosed herein.

Figure 13:
FIG. 13 s a screen display of an exemplary home page of a site using the disclosed system and method.

FIG. 13 illustrates a screen display of an exemplary home page of a site using a preferred embodiment of the social platform and ecommerce system described herein. The home page is the page available to the public and does not require logging into the site. A user can register as shown by including data in the fields first name 300, last name 302, email address 304, password 306, confirm your password 308, gender 310 birth month 312, birth day 314 and birth year 316. An image code 318 is typically required to avoid registration attempt made through automated means. Images at 320 display and update as necessary on the site an illustrate users currently on the site. The most recent comments on items available on the site are updated at 322. Category browsing can be navigated at 324, category searching can be accomplished at 326 with search words entered at 328. The site contemplates advertising space and advertising postings can be placed on the site generally at 329. Users can log in to the site at 330, and will be prompted to register when they choose sell at 332. To sell on the site a user is typically required to register on the site and user email address and choose a password. A user can donate to charity by designating a certain amount of any sale proceeds to a chosen cause. The process can begin at many places on the site, one being at 333.

Figure 14:
FIG. 14 is a screen display of the exemplary home page of FIG. 13 showing drop down alternatives for an explore function.

FIG. 14 illustrates a version of the home screen of FIG. 13 showing a choice of recent update 334 which executes a search of the site data tables and displays the recent updates and blog posts to the site. New members at 336 may also be displayed by a search of the data tables for the newest members to the site.

Figure 15:
FIG. 15 is a screen display of the exemplary home page of FIG. 13 showing drop down alternatives for browsing categories available on the site.
Figure 16:
FIG. 16 is a screen display of the exemplary home page of FIG. 13 showing alternatives for searching categories available on the site.

FIG. 15 illustrates the home page of FIG. 13 showing the details of the categories at 338. Choosing a category allows a non-registered user to browse one or more categories on the site. FIG. 16 illustrates the home page of FIG. 13 showing the details for searching categories available in the data tables of the site at 340. Specific search terms can be entered in the search field at 328 to narrow search results for the most relevant data on the site. A search is executed and the data tables searched when the user clicks in search button 342.

Figure 17:
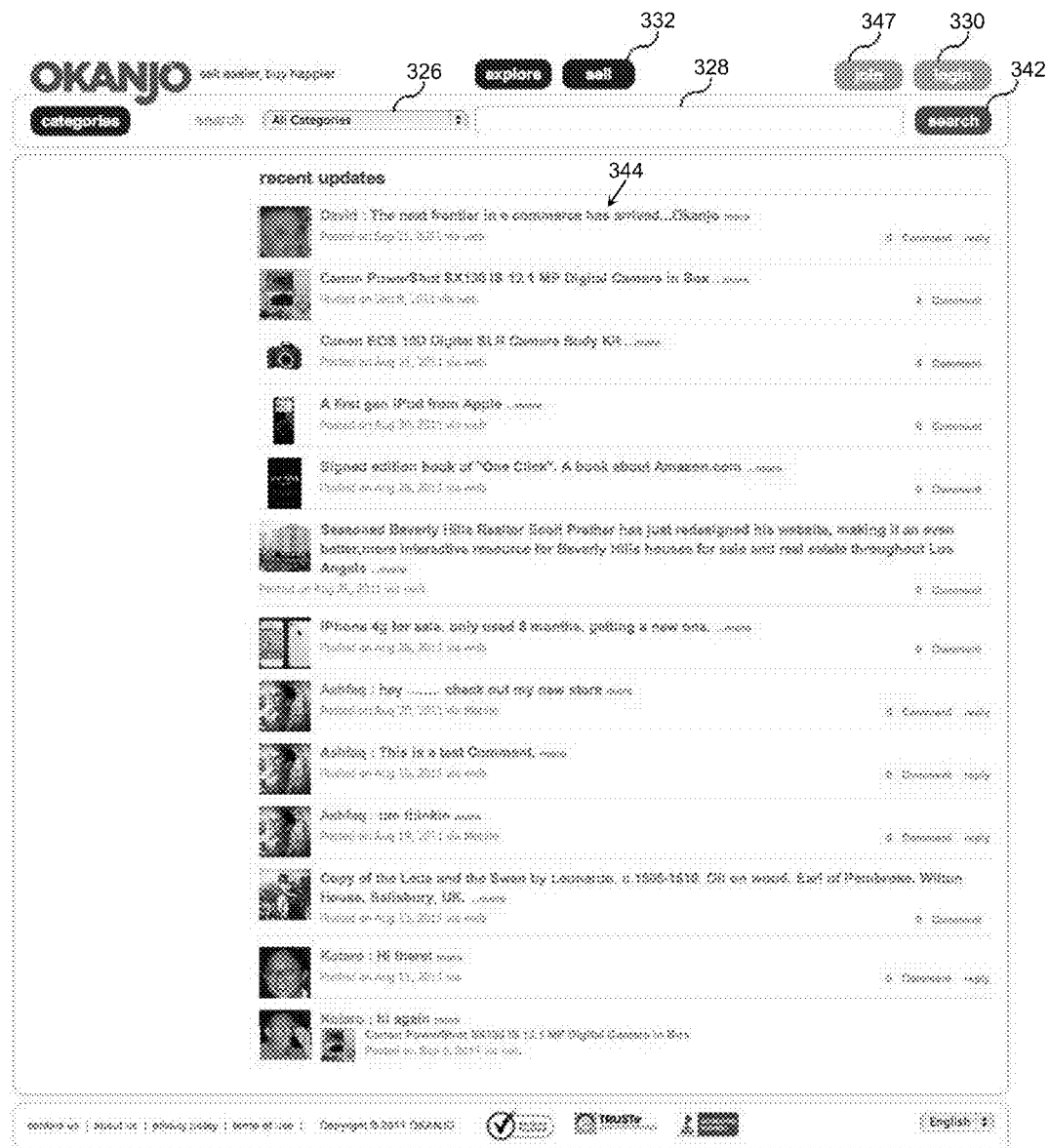
FIG. 17 is a screen display of an exemplary members update page showing most recent comments by members on the site.

FIG. 17 illustrates an exemplary member's update page showing most recent comments by members on the site at 344.

Figure 18:
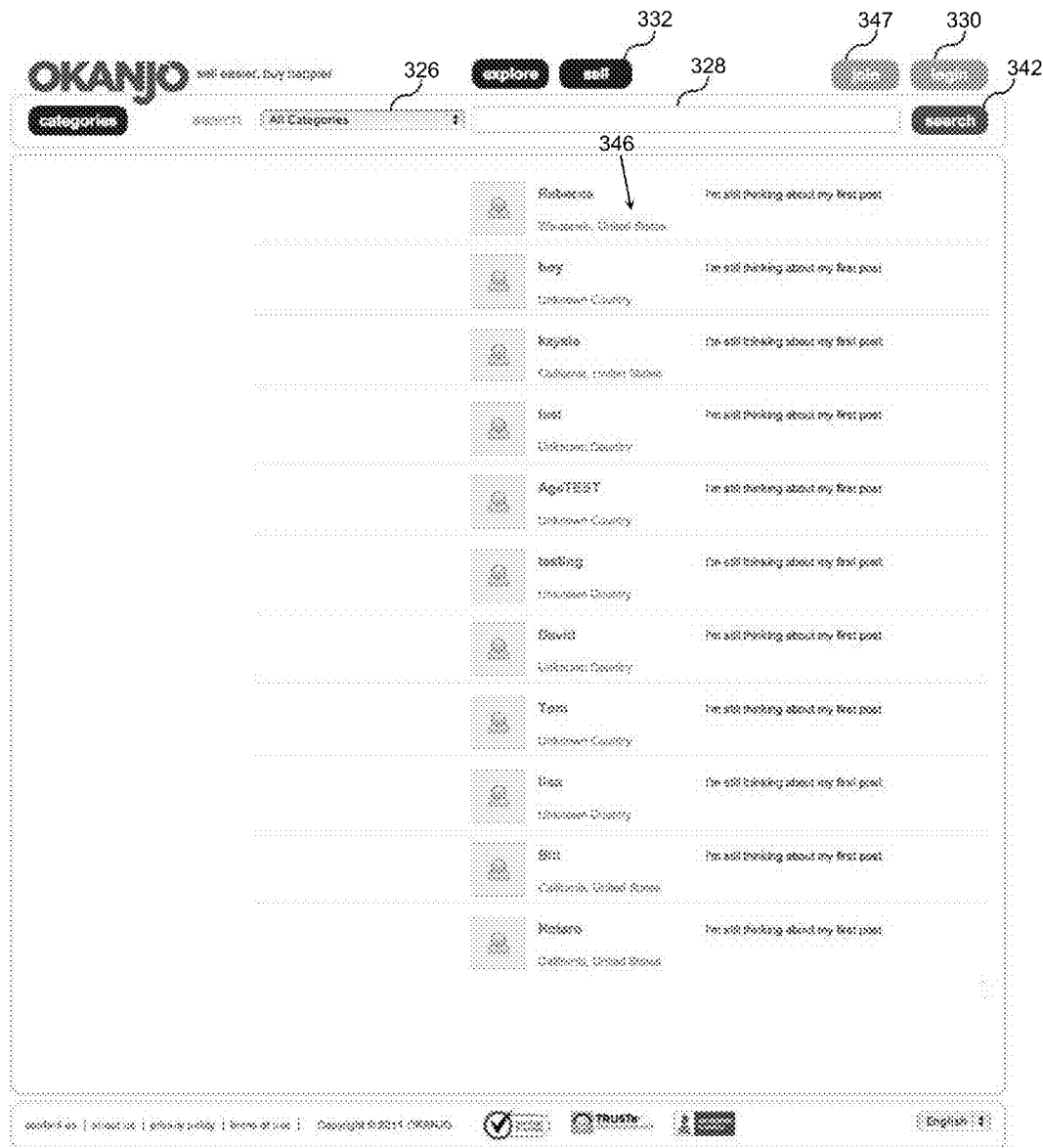
FIG. 18 is a screen display of an exemplary page showing the members on the site.

FIG. 18 illustrates an exemplary page showing the members currently on the site at 346.

Figure 19:
FIG. 19 is a screen display of an exemplary registration page for registering on the site.
Figure 20:
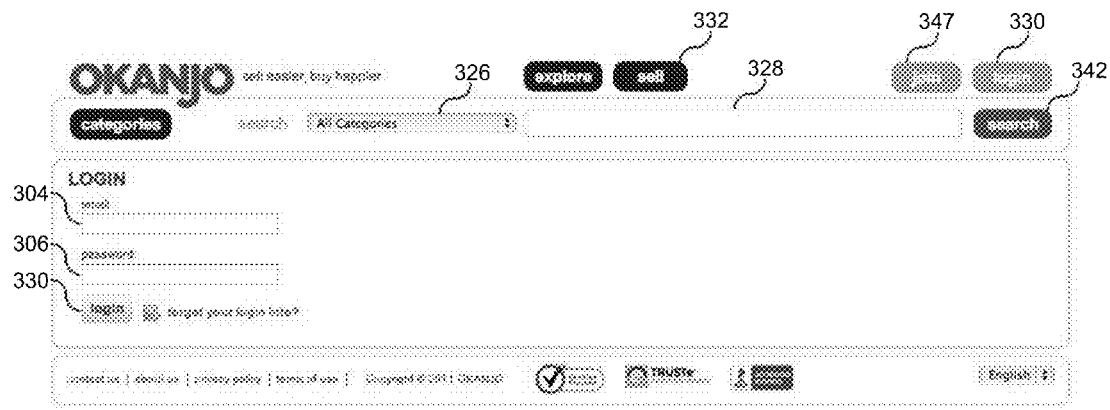
FIG. 20 is a screen display of an exemplary login page for logging into the site.

FIG. 19 illustrates an exemplary registration page accessible through various links on the site, including join button 347, to provide the data elements to register on the site providing access to the site for purchasing and selling items as desired. Site registration includes data details on fields for first name 300, last name 302, email address 304, password 306, confirm your password 308, gender 310 birthday month 312, birthday day 314 and birthday year 316. Upon completion of the registration process the site confirms activation by email and the user will be able to login as illustrated in FIG. 20 by entering the user's email address 304 and password 306 has access to set up a buyer page and a seller page after logging into the site.

Figure 21:
FIG. 21 is a screen display of an exemplary page on which items on the site are being talked about.

FIG. 21 illustrates an exemplary screen display which lists items on the site are being talked about at 348. The most recent posts for given items are displayed. Such a list can be customized through the user's login page to display items for particular users, sellers or groups. Such settings allow a user to customize the data elements being searched on the site to follow the details of particular site activities filtered to meet the requirements of the user.

Figure 22:
FIG. 22 is a screen display of an exemplary home page of a user logged into the site.

FIG. 22 illustrates an exemplary screen display of a home page of a user who has logged into the site shown by the details at 350. The user can be a seller/merchant, a buyer or a registered user on the site. The details provided for each type of user include data elements of one or more of user picture 352, following 354, followers 356, number of active listings 357, home 358, direct message 360 and return policy 362. A seller will have additional data elements in being able to choose a selling method at 364 including priced to sell at 366, make an offer at 368 and auction at 370. In addition, a seller will be able to provide a charitable donation through the link titled "Givejo" at 372. In addition user's can make comments at 374 and identify items they are looking for at 376. A registered user that is a seller on the site can see the items listed in the seller's store by clicking the "my store" button at 377. The seller can logout at 379.

Figure 23:
FIG. 23 is a screen display of an exemplary customized update page of a user logged into the site.
Figure 24:
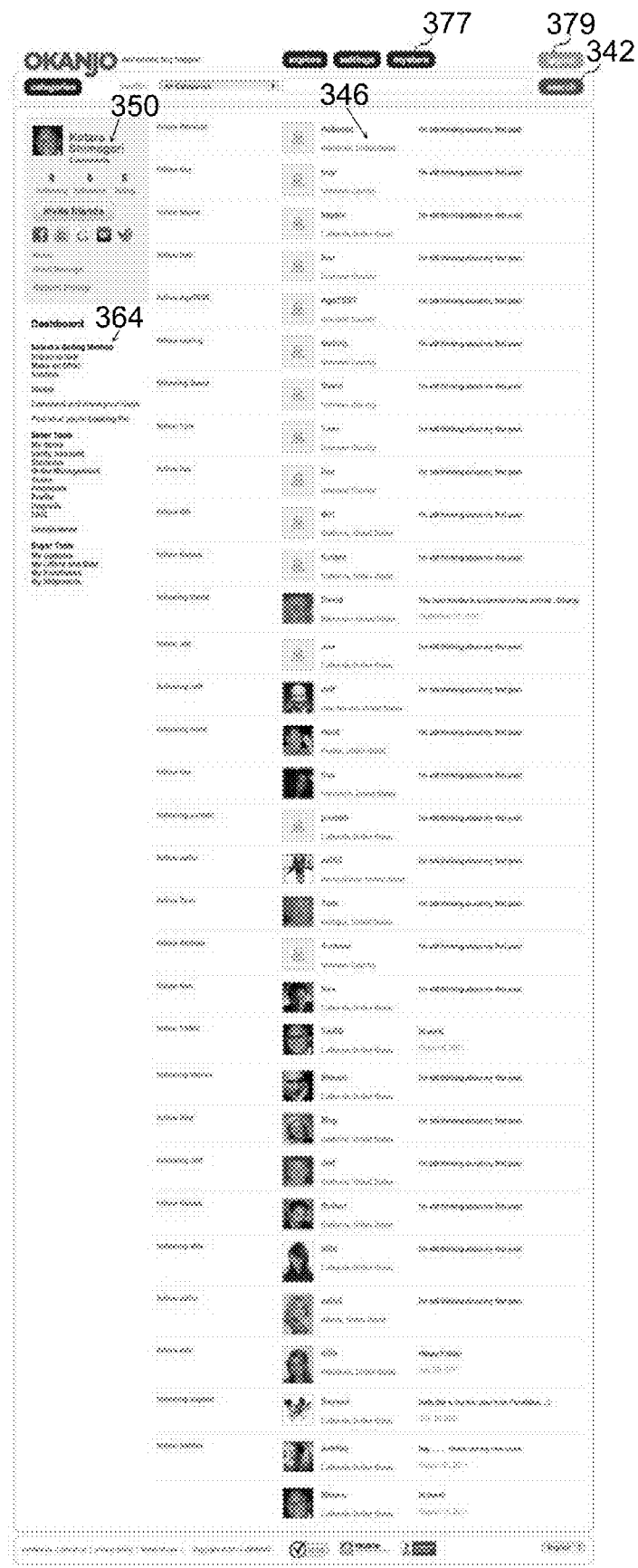
FIG. 24 is a screen display of an exemplary community page of a user logged into the site.

FIG. 23 illustrates an exemplary screen display of a customized update page of a seller logged into the site. It is contemplated that several filters and display configurations will be customizable by the seller to display the most relevant data for the user on the site. The same functionality as described above can be navigated from this page by each seller that has logged onto the site. FIG. 24 illustrates an exemplary screen display of a community page of a seller logged into the site. The most recent post of each user is displayed in a readable format at 346. Such a display may also be customized to display only the users of interest by the seller.

Figure 25:
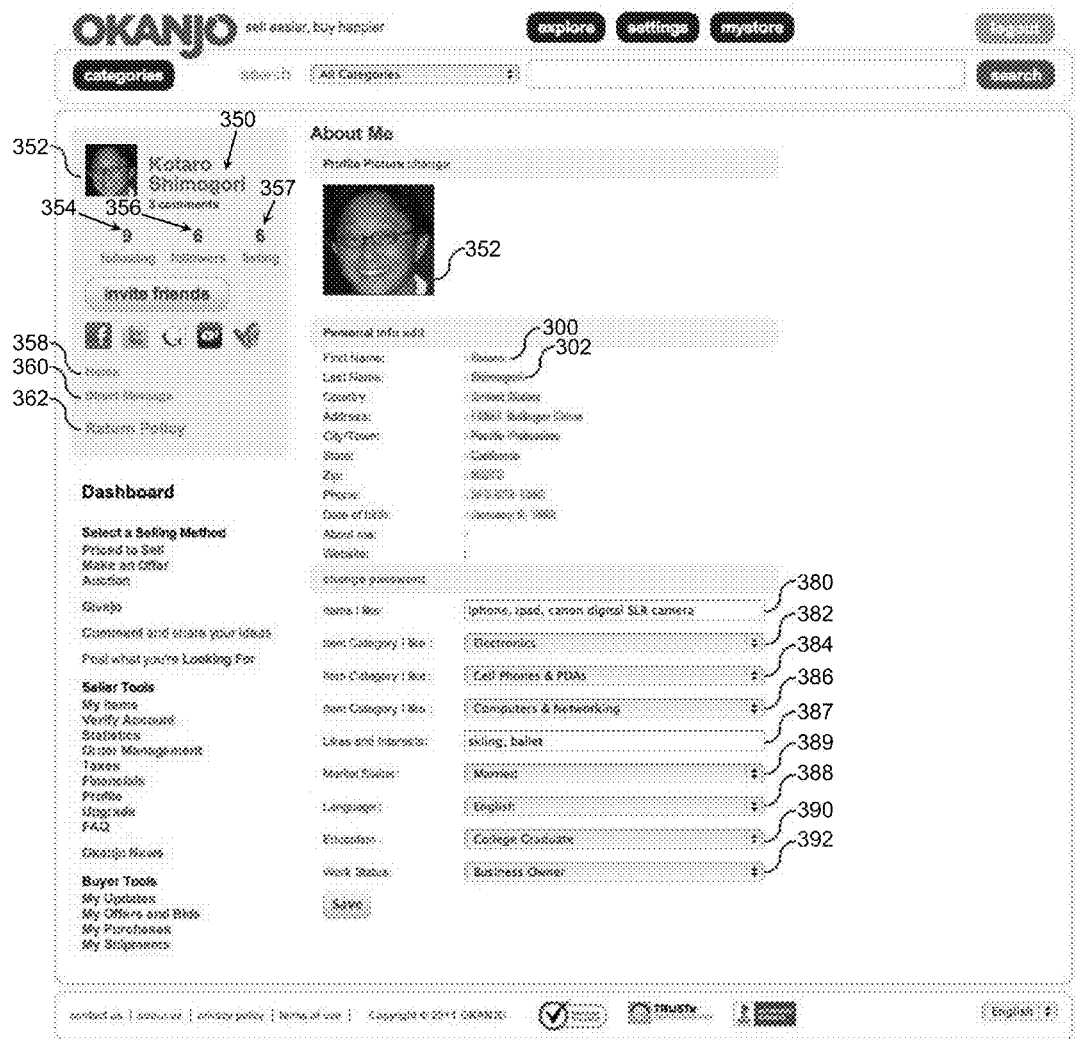
FIG. 25 is a screen display of an exemplary member profile page of a user logged into the site.

As illustrated in FIG. 25, an exemplary member profile page of a user logged into the site includes personal data of the user with data fields for preferences for displaying such details to users on the site. Such data details may include items liked by the user at 380, categories of interest to the seller at 382, 384 and 386, likes and interests at 387, marital status at 389, language preference at 388, education details at 390 and work status details at 392. All such data details are placed in the site tables for association with the user.

Figure 26:
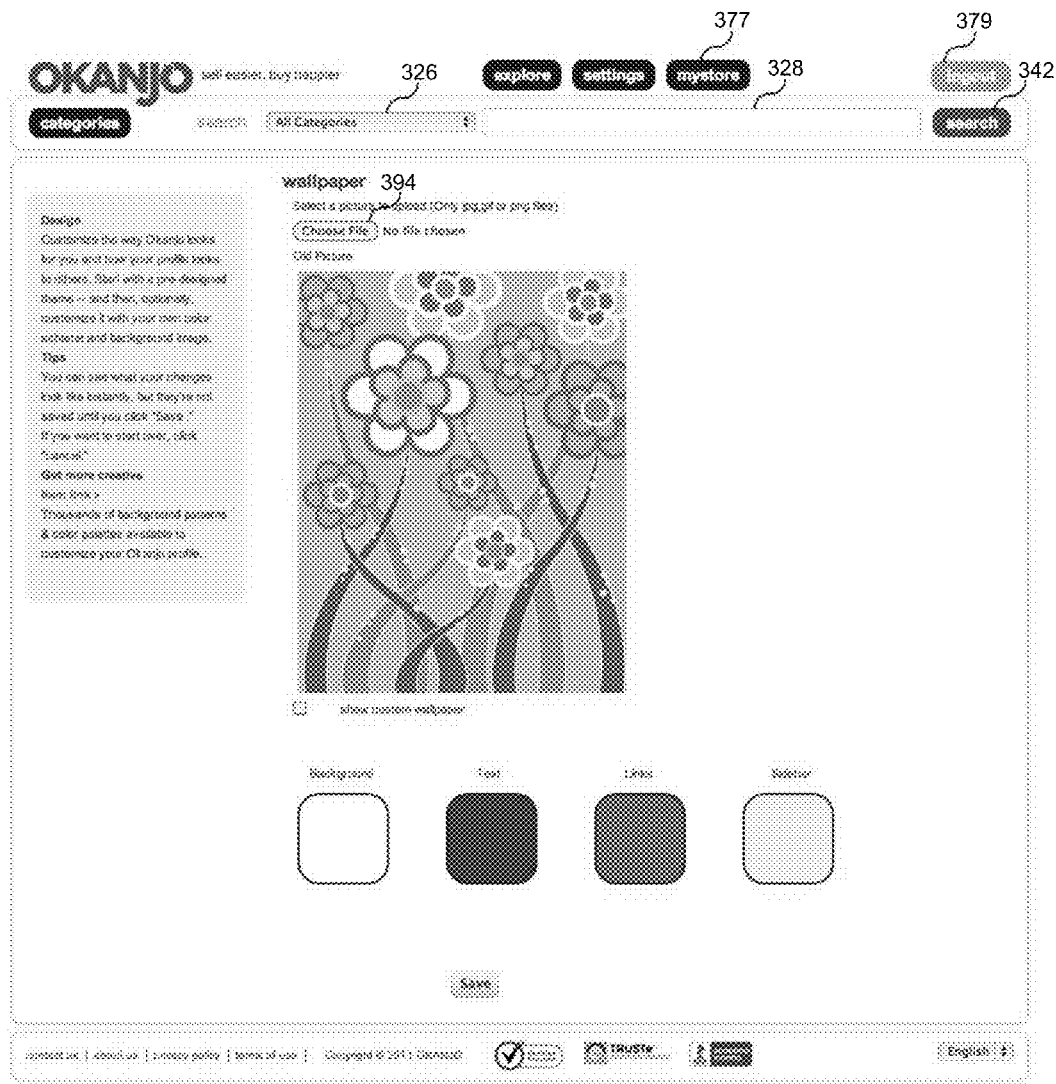
FIG. 26 is a screen display of an exemplary design page for customizing the display of item listed on the site.

FIG. 26 illustrates an exemplary screen showing a design page for customizing the template of an item listed by a seller on the site. Customization of the listing template display can include a design uploaded by the seller at 394.

Figure 27:
FIG. 27 is a screen display of an exemplary alerts page for customizing how a user is alerted to site activities.

FIG. 27 illustrates an exemplary screen showing an alerts page for customizing how a user is alerted to site activities. Alerts can be emailed, sent to a mobile device or otherwise transmitted to a user. The user can customize the alerts to be received by choosing comments at 396, messages at 398 or followers at 400.

Figure 28:
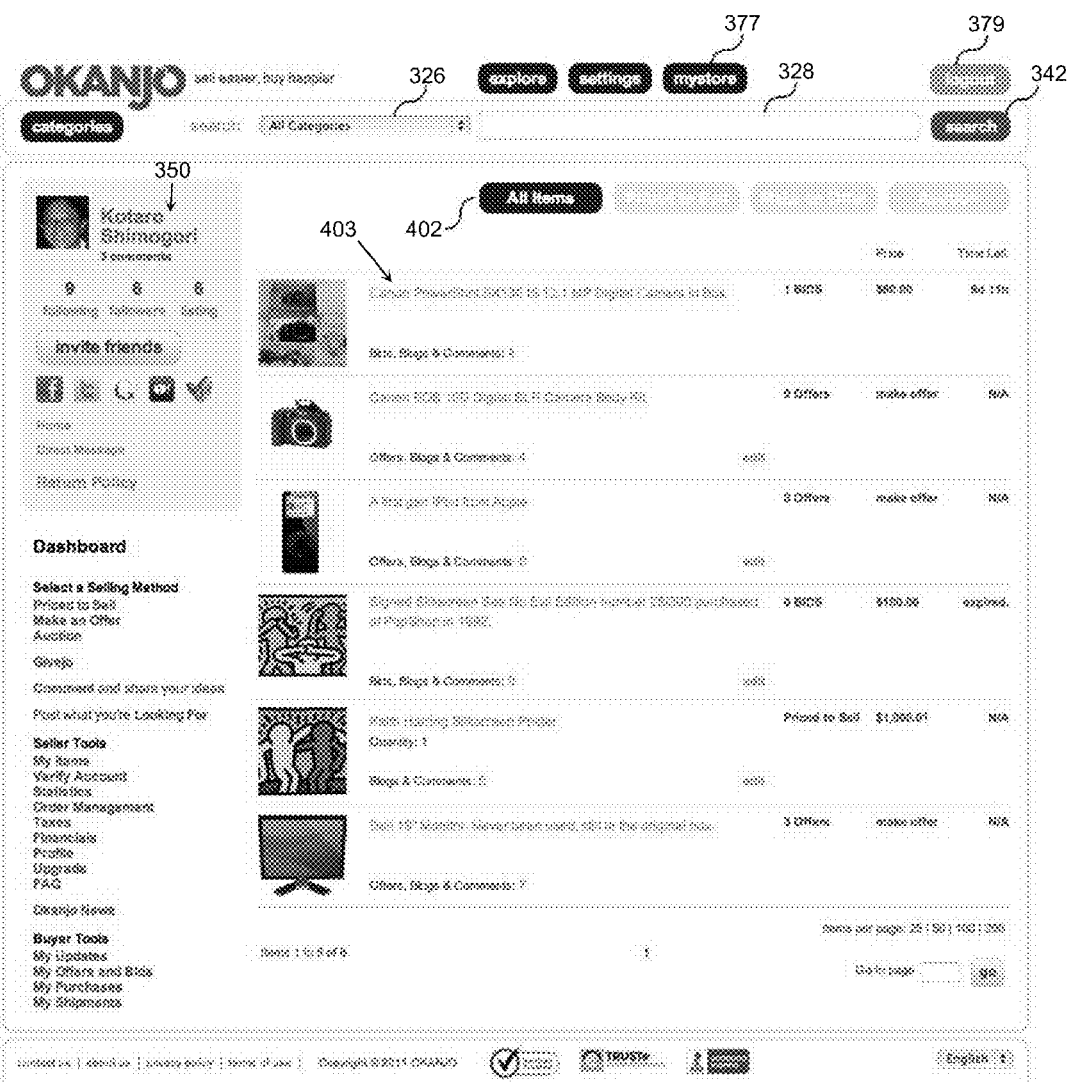
FIG. 28 is a screen display of an exemplary seller store page showing all items listed by a user.
Figure 29:
FIG. 29 is a screen display of an exemplary seller store statistics page showing details of store activity for a user.

As illustrated in FIG. 28, an exemplary seller store page shows all items listed by a user at 402. Such display may be customized by the seller to display the most relevant data for each seller and can include additional function buttons to display items priced to sell, items soliciting an offer or items on auction. The display at 403 will change accordingly based on the search of the data tables and retrieval of responsive date. FIG. 29 illustrates a screen display of an exemplary seller store statistics page showing details of store activity for a seller. Such details may include the date on which a seller registered with the site at 404, the total number of total visitors to date at 406, the number of unique visitors at 408, the average visitors per day at 410, average unique visitors per day and per month at 412, total item sold at 414, number of items priced to sell at 416, number of items on offer at 418, the number of items on auction at 420, the number of comments on sellers site activity at 422, and the sell through ratio details at 424. It may be appreciated that any number of detailed data elements can be calculated and provided to the user through this page, and such data details and their display can be customized by the site user. A seller can increase the size of a store by upgrading by clicking at 425.

Figure 30:
FIG. 30 is a screen display of an exemplary order management page showing details and status of individual transactions of a user.

FIG. 30 illustrates an exemplary screen showing an order management page displaying details and status of individual transactions of a seller. The data details include an order number at 426, an item name at 428 the number of units of a given item at 430, the total amount of the sale at 432, the buyer name at 434, the tax rate at 436, the type of sale at 438, the status if the item on the site at 440, the action taken by the seller at 442, the date an item was shipped at 444 and the date of the sale at 446. Items in order management status can be searched by entry of search words at 448. All data is searched in the data tables and, when retrieved and displayed, can be downloaded to an external spreadsheet at 449.

Figure 31:
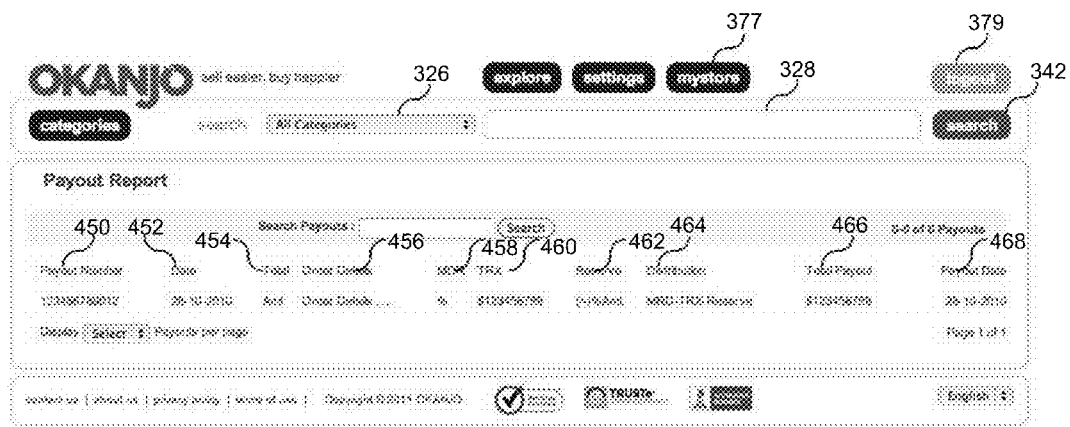
FIG. 31 is a screen display of an exemplary payout report showing details and status of payments for items sold by a user.

An exemplary screen display of a payout report showing details and status of payments for items sold by a user is illustrated in FIG. 31. Data details are captured by the system and shown as payout number 450, date of the sale at 452, the total amount of the sale at 454, order details at 456 the merchant discount rate (MDR %) at 458, the transaction fee (TRX) at 460, the reserve percentage to be held back at 462, the distribution to the seller for the item at 464, the total payout for the item at 466 and the date of the payout to the seller at 468. The total payout 466 is calculated by subtracting the merchant discount rate 458 and the transaction fee 460 and the reserve 462 from the total 454 (Total Payout 468=total 454−MDR 458−TRX 460−Reserve 462).

Figure 31A:
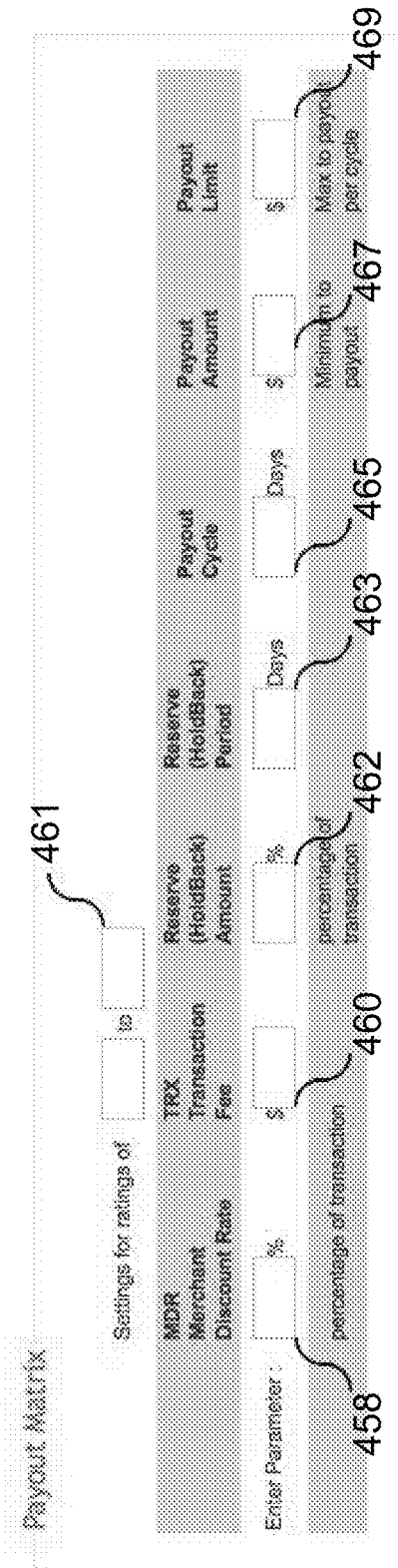
FIG. 31A is an exemplary layout of an administration site page showing the parameters to be set to implement a payout process to a seller for items sold on the site.

The seller payout algorithm is illustrated in FIG. 31A and is set through administrative action on the site. Data details are entered by the site administrator and are captured by the system. Such data details include a range of rating for a seller to which a set of parameters for payout apply at 461. The merchant discount rate (MDR) 458, the transaction fee (TRX) 460 and the reserve amount 462 are those as described above. The payout is determined by such variables along with site administrator set variables for a reserve holdback period 463 which is a number of days that are waited until processing of a seller's payment can occur, the payout cycle 465 which is the number of days between payouts, the minimum payout amount 467 which is the smallest amount to be paid for a given payout to a seller and the payout limit 469 which is the maximum payout that can be made for a given seller in a given payout cycle. The combination of these variables determines the outcome of the calculation of the total payout 468 as described above. It will be appreciated these variables may be modified for each seller. Such modification would provide for each seller to be paid differently based on total volume transacted on the site, the experience of a seller, the time a seller has been registered on the site and a variety of other variables important to the site security, site operation and site safety.

Figure 32:
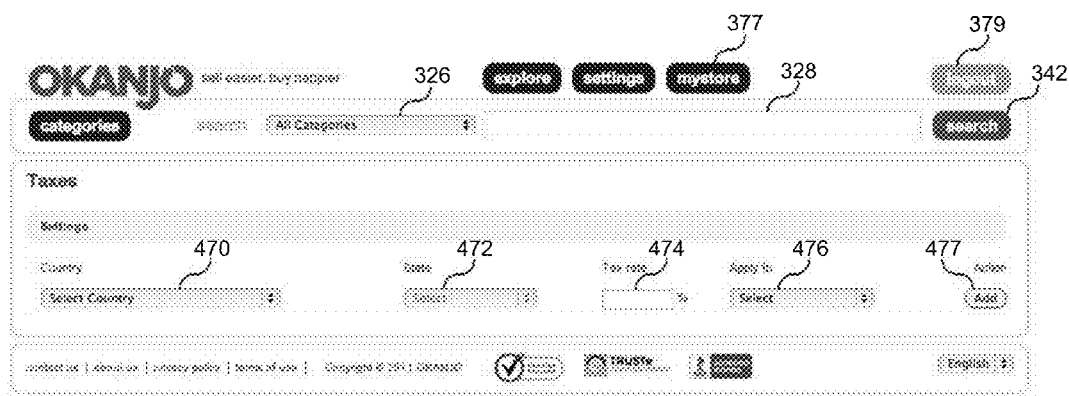
FIG. 32 is a screen display of an exemplary page allowing a user to set taxes charged for transactions on the site.
Figure 33:
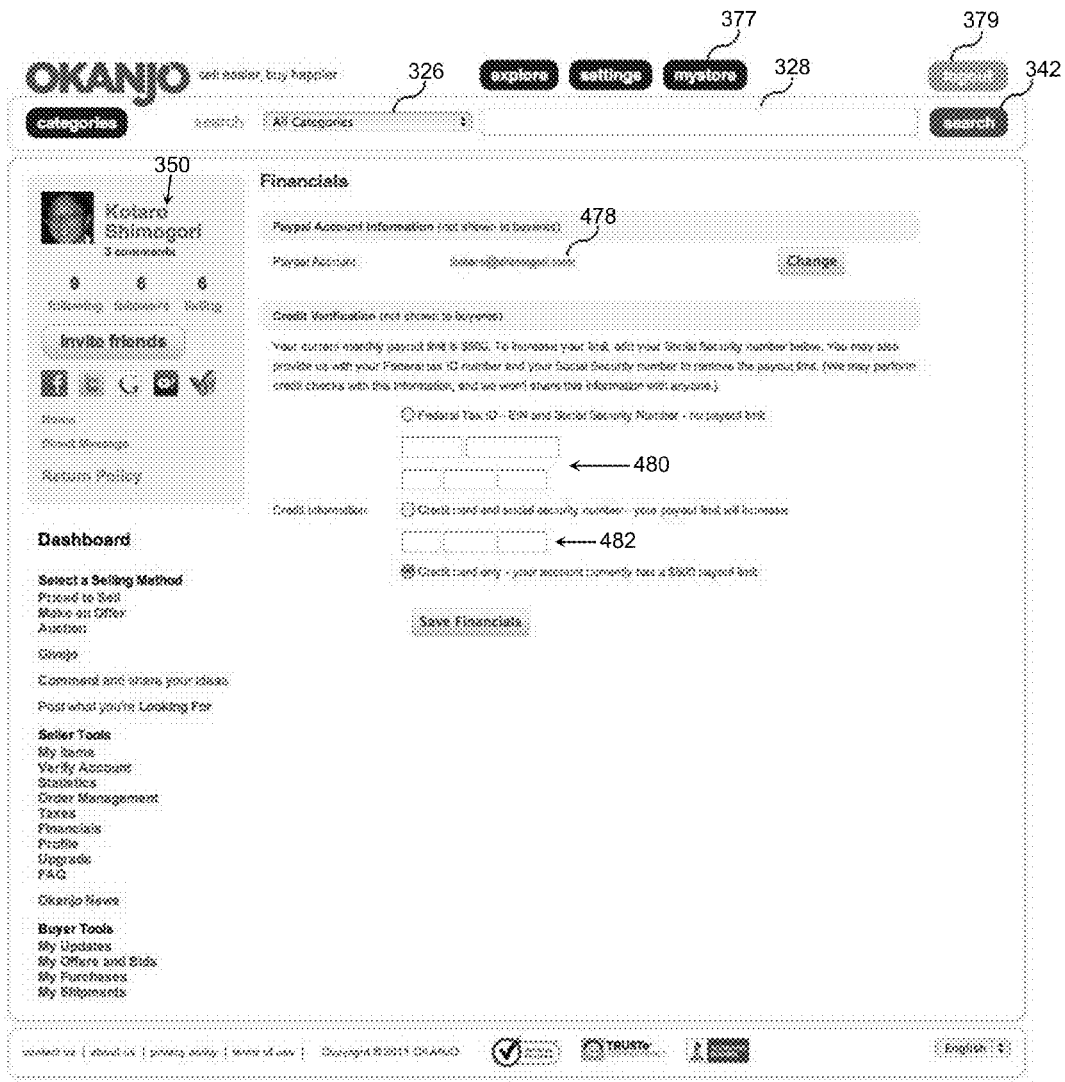
FIG. 33 is a screen display of an exemplary page allowing a user to provide general financial information for transactions on the site.

As illustrated in FIG. 32, an exemplary page allows a user to set taxes charged for transactions on the site. Tax rates may vary by state and by city. The country of the seller is set at 470, the state is set at 472, the tax rate is set at 474 and to which sale the tax rate applies is set at 476. The tax rates are set by country and state and are added to the data tables associated with each seller at 477. The ability to set tax rates in this manner will allow site sellers and merchants to charge, collect and pay the appropriate taxes when and where necessary.

Figure 34:
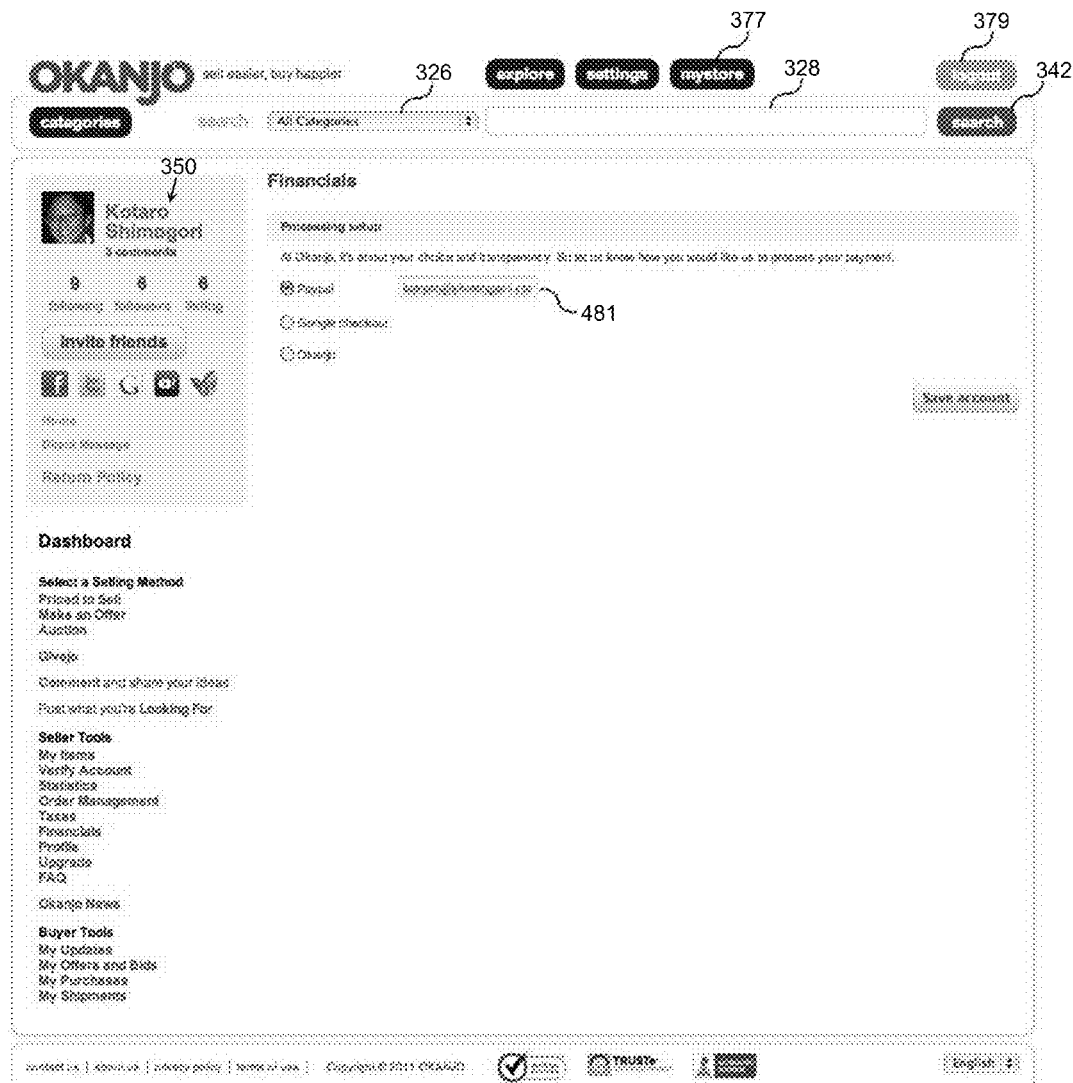
FIG. 34 is a screen display of an exemplary page setting up payment processing through PayPal for a user.
Figure 35:
FIG. 35 is a screen display of an exemplary page setting up payment processing through Google checkout for a user.
Figure 36:
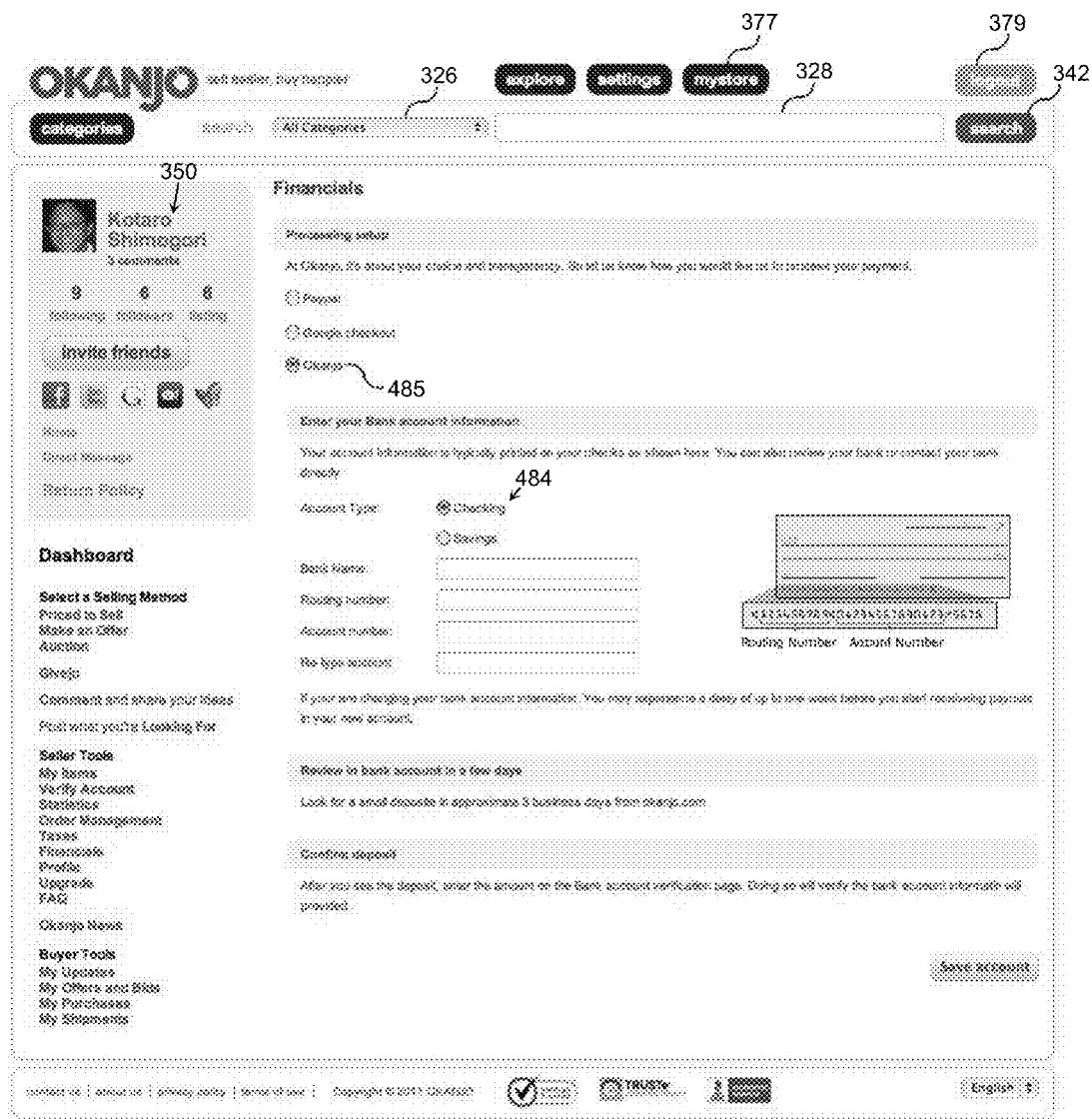
FIG. 36 is a screen display of an exemplary page setting up payment processing through the site's own payment processing for a user.

FIG. 33-36 illustrates exemplary screens displaying pages allowing a user to provide general financial information for transactions on the site. Such financial details include a financial account email address at 478, a federal tax identification number (EIN or Social Security Number) at 480 and credit card information at 482. Payouts may be increased to certain sellers based on the information provided. If a credit card only is provided, the seller will have a smaller payout at any given point in time and the hold back of funds by the site will be greater for a longer period of time. If a credit card and EIN or SSN number are provided, the hold back will be smaller and will be necessary for a shorter period of time. The site can change these specific details on a case by case basis in the site management protocols. FIG. 34 illustrates a screen display of an exemplary page setting up payment processing through PayPal at 481. FIG. 35 illustrates a screen display of an exemplary page setting up payment processing through Google checkout at 483. FIG. 36 is a screen display of an exemplary page setting up payment processing through Okanjo's own payment processing at 485. When the Okanjo payment processing is used, the seller will provide the necessary banking details at 484 which will be securely stored on the site for use in directing payments to the seller's preferred bank.

Figure 37:
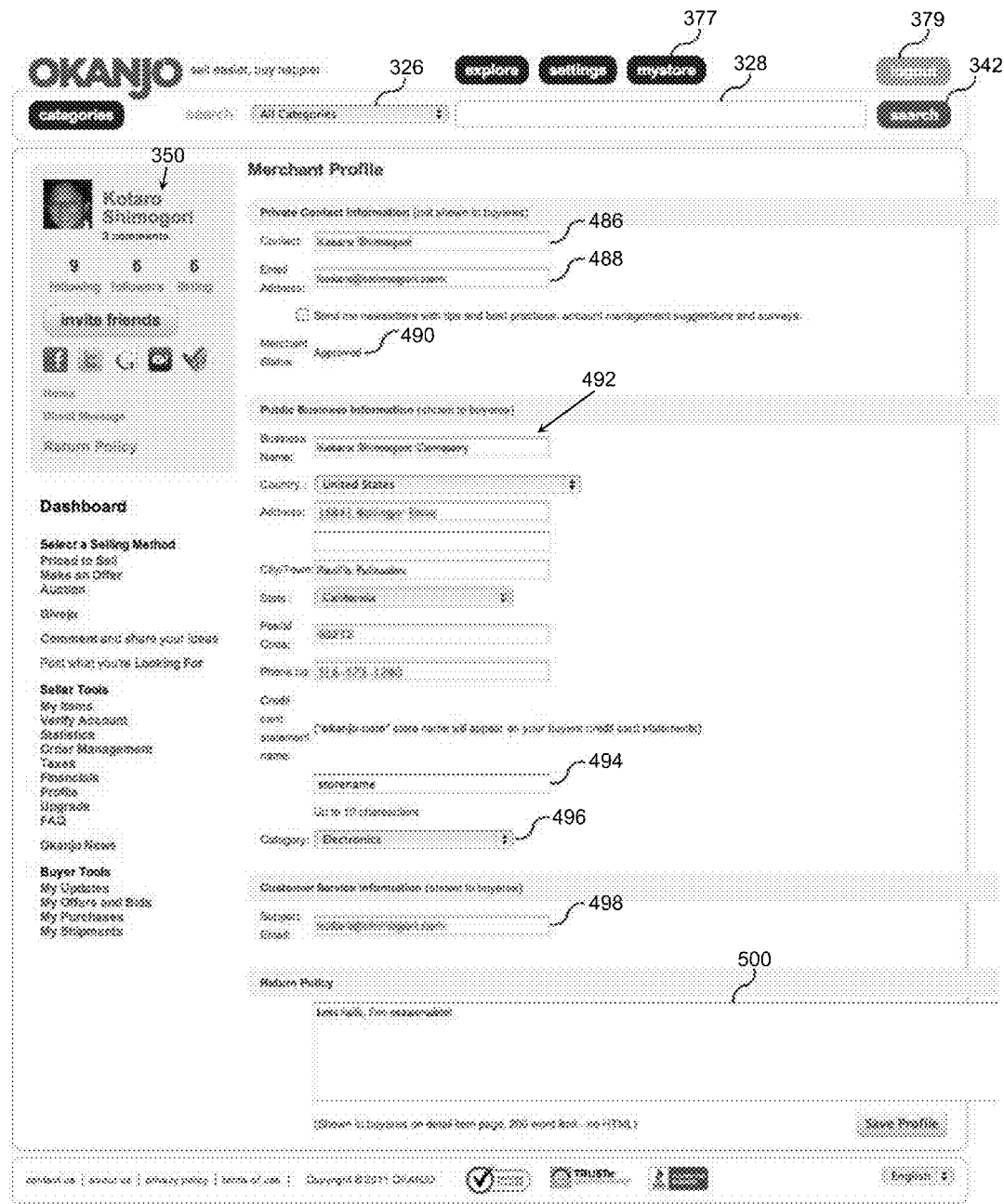
FIG. 37 is a screen display of an exemplary merchant profile page for a user.

FIG. 37 illustrates an exemplary screen display of a merchant profile page for a user. Data details for a merchant on the site include a private contact at 486, private email address at 488, merchant status at 490, the business name and address details at 492, the name of the store which will appear on the charge detail at 494, the preferred category of the seller merchant at 496, the support email address at 498 and the return policy of the seller at 500.

Figure 38:
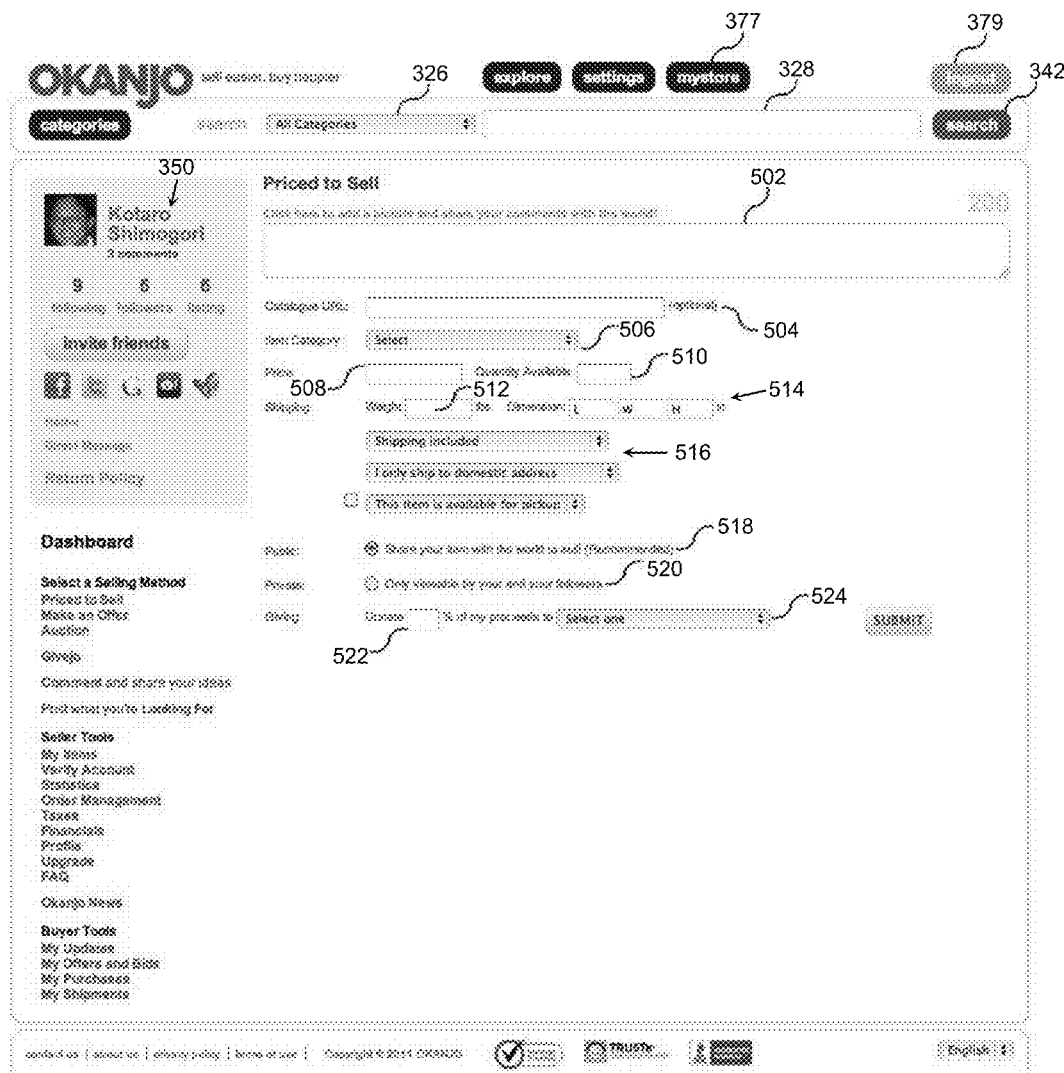
FIG. 38 is a screen display of an exemplary page setting up an item for sale at a set price.

FIG. 38 illustrates an exemplary screen display setting up an item for sale at a set price. The page requires minimum data details to complete a listing including a description at 502, a catalogue URL to display data from another site at 504, item category at 506, price at 508, quantity available at 510, shipping weight at 512 and dimensions at 514, shipping details at 516, public display option at 518, a private display option at 520, and the ability to donate to a charitable cause by providing a certain percentage of the sale proceeds at 522 to a charity of the seller's choice at 524.

Figure 39:
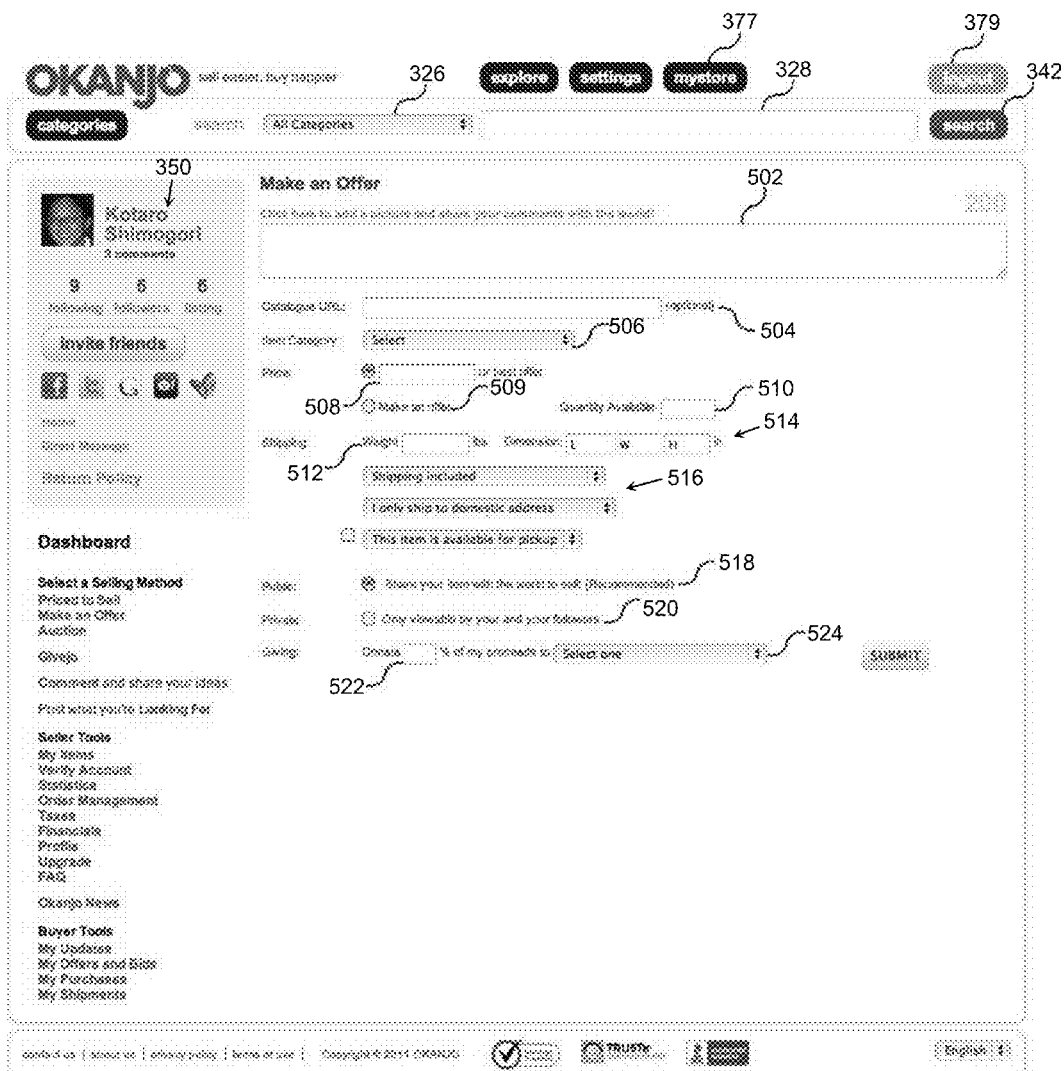
FIG. 39 is a screen display of an exemplary page setting up an item for making an offer for purchase.

FIG. 39 illustrates an exemplary screen display to set an item up for sale by allowing the buyer to make an offer to the seller to purchase at an offered price. This page also requires minimum data details to complete the listing including description at 502, catalogue URL to display data from another site at 504, item category at 506, price at 508, ability to allow the buyer to make an offer at 507, quantity available at 510, shipping weight at 512 and dimensions at 514, shipping details at 516, public display option at 518, private display option at 520, and the ability to donate to a charitable cause by providing a certain percentage of the sale proceeds at 522 to a charity of the seller's choice at 524.

Figure 40:
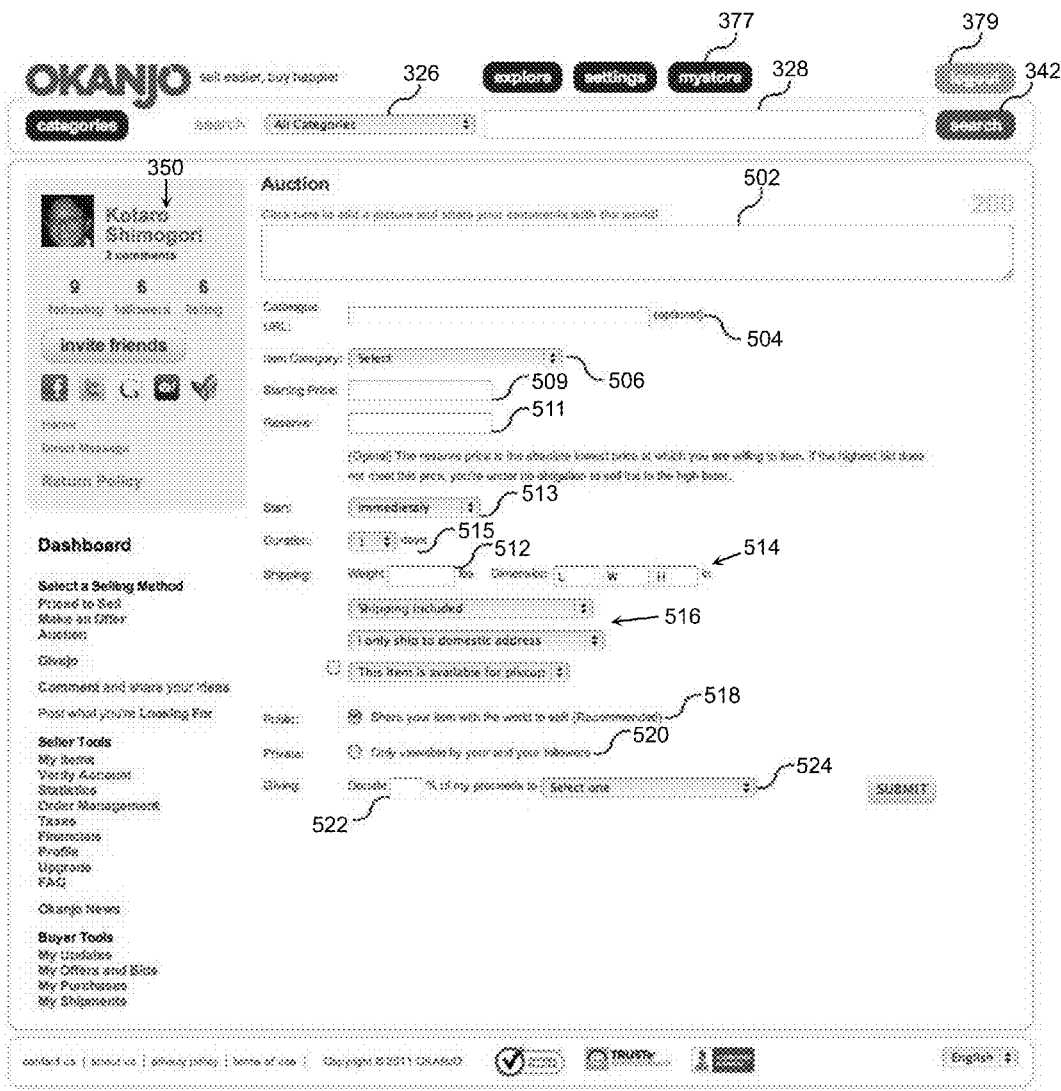
FIG. 40 is a screen display of an exemplary page setting up an item for auction.

FIG. 40 illustrates an exemplary screen display to set an item up for auction. As noted above an auction may be a forward auction, a reverse auction, a live auction, a Dutch auction or the like. This page also requires minimum data details to complete the listing including description at 502, catalogue URL to display data from another site at 504, item category at 506, starting price at 509, a reserve amount at 511, the starting time at 513, duration at 515, shipping weight at 512 and dimensions at 514, shipping details at 516, public display option at 518, private display option at 520, and the ability to donate to a charitable cause by providing a certain percentage of the sale proceeds at 522 to a charity of the seller's choice at 524. The auction may also include a quantity available if more than one item is to be auctioned off in the same event. In such situations, multiple bidders may win an item all at the same winning bid price or at successively lower bid prices until all quantities are depleted. In addition, it is contemplated that offers can be sent to the next highest bidders if multiple quantities of a given item are available.

Figure 41:
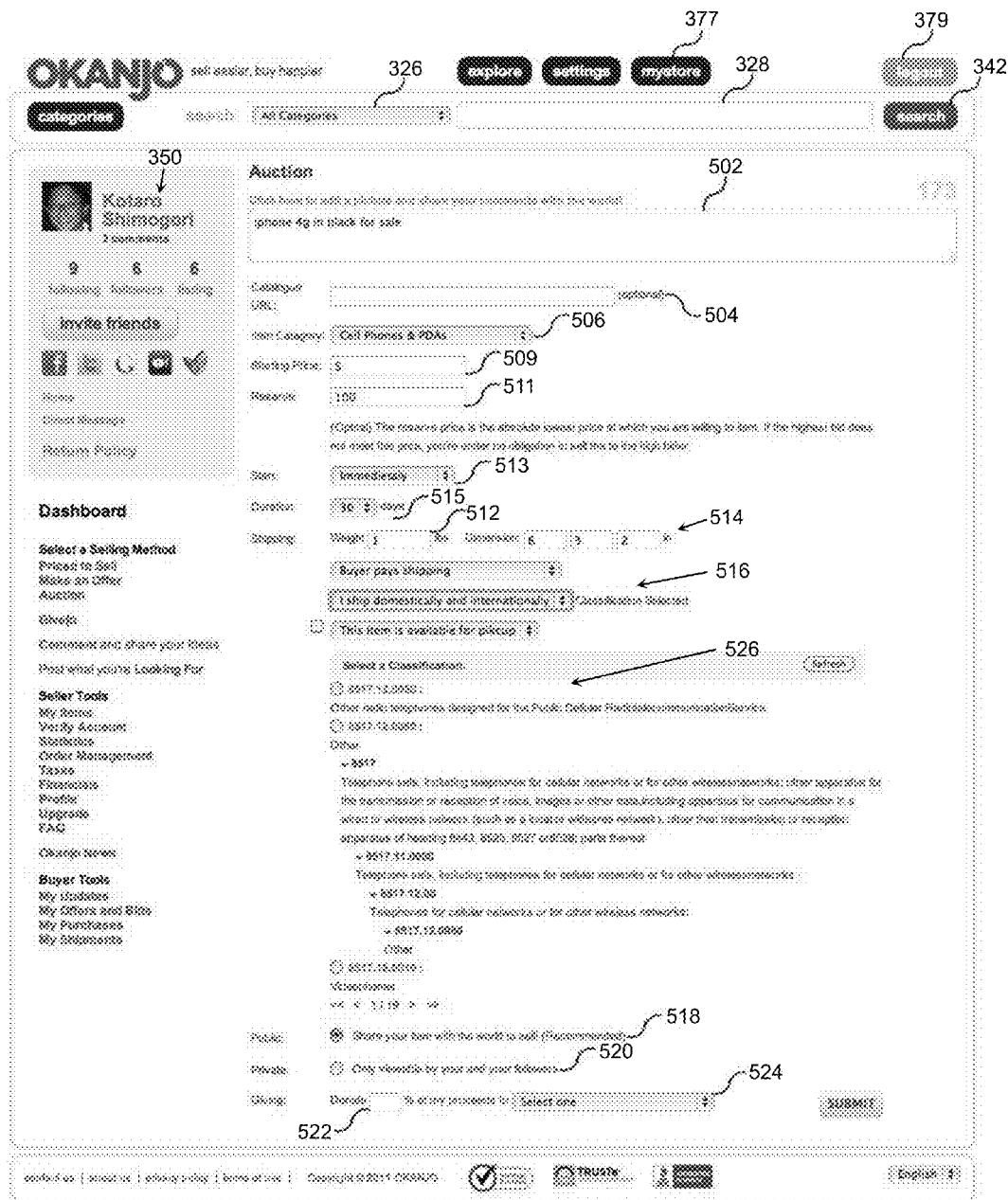
FIG. 41 is a screen display of an exemplary page showing details for setting up shipping on an item including international shipping details and harmonization tariff code details.

FIG. 41 illustrates an exemplary screen display showing details for setting up shipping on an item including international shipping details. International shipping requires compliance with the harmonization tariff schedule (HTS) which is a specific set of harmonization tariff classifications or harmonization tariff codes (HTC) to classify the item for international shipment. Such codes typically chosen by the system based on user input of description of the item to be shipped. Harmonization tariff codes 526 are displayed based on the category chosen at 506. The seller then chooses the most accurate harmonization tariff codes from the list displayed. The description of the item entered at 502 is associated with the chosen harmonization tariff. It will be appreciated that the system, after arriving at the appropriate harmonization tariff code, will complete a template to dynamically generate a shipping label that can be automatically printed by the social platform ecommerce system. The data tables will be accessed based on the input by the user to generate the required data elements from the inter-related data tables to accurately complete the shipping template for printing by the system.

Figure 42:
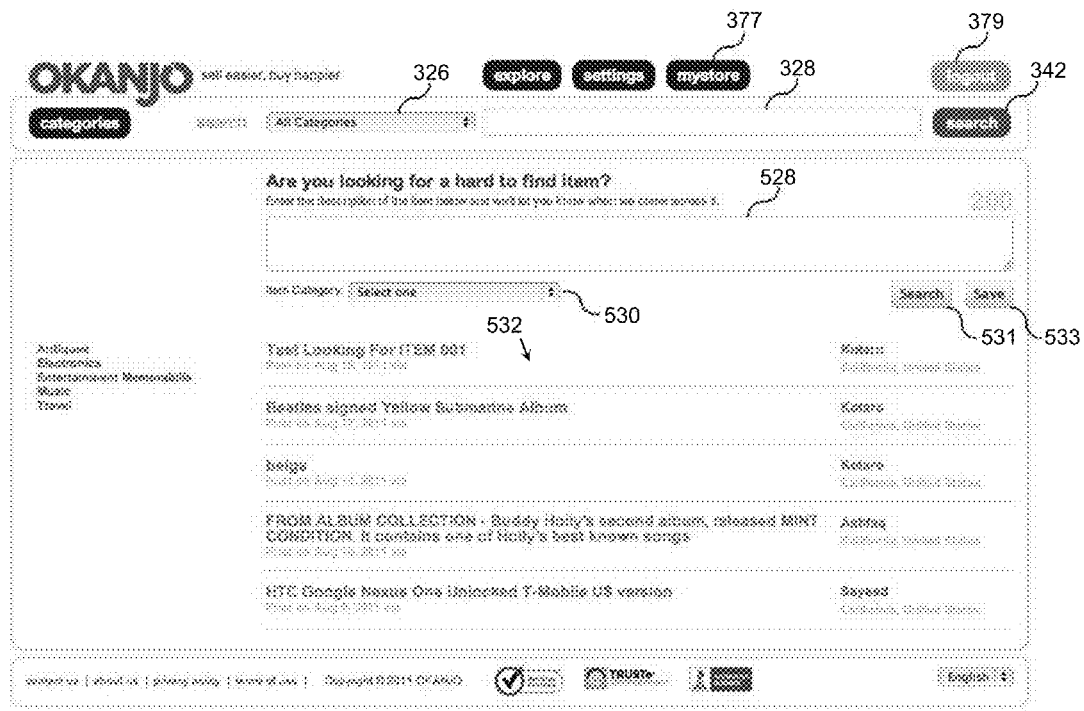
FIG. 42 is a screen display of an exemplary page for setting up site notification for specific item wanted by a user.

As illustrated in FIG. 42, an exemplary screen display for setting up site notification for specific item wanted by a user is provided. A description is entered by the user at 528 and a category is chosen at 530. The site can then be searched at 531 to locate a similar item having at least 60% of the words included in the description. For example, for the search of item matching the words "apple iphone 5G white," (a total of four words), if 60% or more of the words are located in the text of the item listed, an alert will be sent to the user. Therefore, if two of four words (50%) are matched in the text of an item, then that item will not generate an alert to the user. However, if 3 of 4 of the words (75%) are matched in the text of an item, that item will generate an alert to the user. When the search is saved at 533, the site will automatically search each new item added to the site to determine if a specific search is fulfilled. If so, the user will be notified that an item the user may be interested in evaluating has been added to the site. All matching items on the site will be displayed in the area of the user's site at 532 when the user logs into the site.

Figure 43:
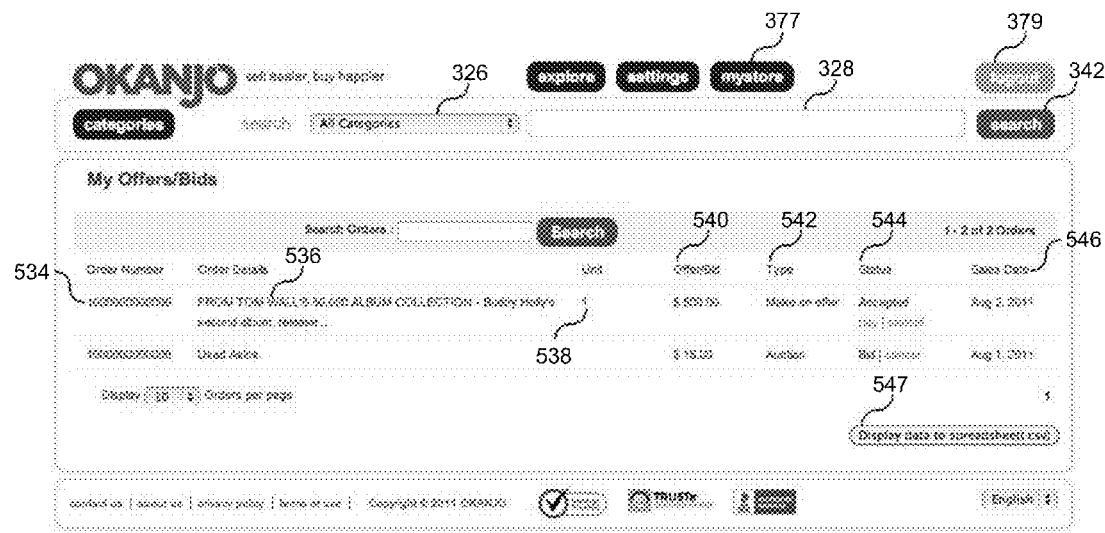
FIG. 43 is a screen display of an exemplary page showing a buyer's offers and bids on the site.
Figure 44:
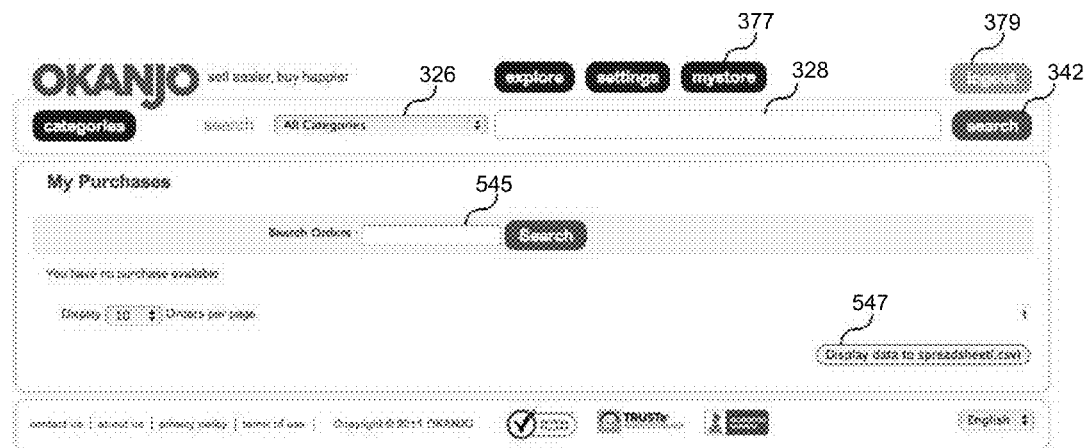
FIG. 44 is a screen display of an exemplary page showing a buyer's purchases on the site.
Figure 45:
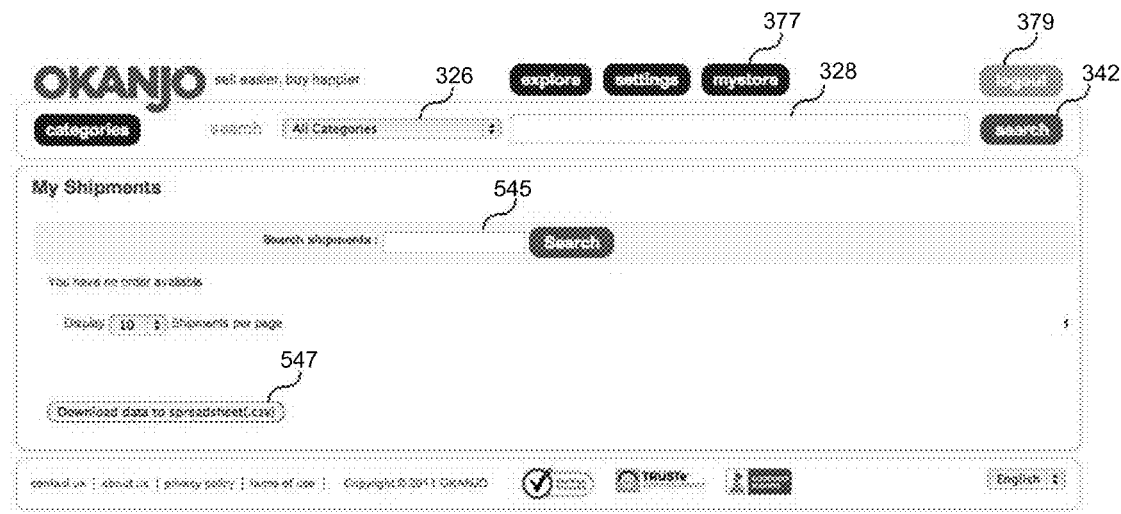
FIG. 45 is a screen display of an exemplary page showing a buyer's shipments of items purchased on the site

FIG. 43 illustrates an exemplary screen display showing a buyer's offers and bids on the site on an item by item basis. The order number is provided at 534, the order details at 536, the quantity purchased by the buyer at 538, the buyer's offer or bid at 540, the type of sale at 542, the status of the sale at 544 and the sale date at 546. The buyer can manage bids and offers from this page, search results from the page at 545 and export the details after data is returned from the data tables at 547. The buyer can manage purchases from the exemplary page illustrated in FIG. 44, search results from the page at 545 and export the details after data is returned from the data tables at 547. The buyer can manage shipments from the exemplary page illustrated in FIG. 45, search results from the page at 545 and export the details after data is returned from the data tables at 547.

A given merchant or seller 104 may use different sales types, including auction, offer for sale or direct sale, for different goods or the same goods, depending on the needs of a particular seller or merchant 104. A typical ecommerce transaction on the site will proceed by the seller 104 identifying an item that the seller wishes to sell. Next, the seller creates a description of the item and includes a picture to show details. More than one picture can be used to show additional detail of the item for sale. A data form as shown in FIGS. 33-36 and described above contains the relevant data fields for the item to be auctioned, offered for sale or sold directly. Such date fields typically include a combination of words and pictures that depict the details of the item. Then the seller sets various sales parameters, such as the dates of the sale, offer or auction, the minimum price the seller will accept for the goods, as well as other factors such as whether the seller is willing to pay shipping costs, to ship outside a given region, and the like as also shown in FIGS. 33-36 and described above. These parameters are typically entered via a conventional computer data entry mechanism, such as a web-based font, such as one created in HTML or a similar markup language like dynamic HTML or the like. As described above, the form contains the relevant data fields for setting sales parameters and when submitted by the seller to the ecommerce host through an online submission mechanism, the servers of the ecommerce host recognize the form and facilitate creation of the auction or listing. Such steps are conventional in online ecommerce transactions and are typically created by CGI scripts or similar coding mechanisms for recognizing HTTP messages and executing appropriate actions.

Once the seller has created the listing, the item can be found online in the sellers profile and on the social platform site. Seller 104 can observe the sales process until it terminates, either with one or more winning buyers 102 who have at least met the seller's minimum price for the item, or with no winner at all. At the time one or more winners have been determined, seller 104 interacts with the winning buyer 102 to complete the transaction. This interaction conventionally requires a communication between seller 104 and buyer 102, such as an exchange of messages on the site, emails through the site email system, a telephone call, or the like. The transaction may include various steps, such as the buyer 102 choosing shipping options, the buyer providing address information on the social platform site auction completion form, and the buyer making payment to the seller 104. Upon payment and verification thereof, the buyer and seller are notified. To complete the transaction, the seller 104 ships the item to the buyer 102 or directs shipment to the buyer 102 from a third party.

Social networking, social media and internet activity is transforming how charitable contributions are made, and will continue to be a large part of the estimated total charitable contributions in the future. It is anticipated that social networking will be a conduit for a significant portion of the charitable donations which are expected to total between $21.2 to $55.4 trillion through 2052. The present disclosure provides the necessary socially conscious platform to generate charitable giving through social networking and social media in providing the seller merchant with the tools necessary to seamlessly add a charitable giving component to their regular social ecommerce activities.

Mobile barcode scanning applications are provided by the systems and methods disclosed herein and will be integrated for seamless searching of the content on the social platform site as well as for efficient listing of items for sale on the site. It is also contemplated that advertising may be present on the social platform site for leveraging the sites reach and revenue generation capabilities. U.S. mobile ad spending in video, display and search will be up 79 percent to reach $743 million in 2010 and spending is expected to be over $1.1 billion in 2011 and more than $2.5 billion by 2014 as stated by eMarketer forecasts. It is contemplated that the systems and methods disclosed herein will provide efficient mobile advertising placement on the social platform site increasing the reach and exposure of up and coming brands, lines and regularly purchased commodities.

Groups of users that primarily interact through communication media including letters, telephone, email or usenet, rather than face to face, may form virtual communities. Virtual and online communities have also become a supplemental form of communication between people who know each other primarily in real life. Many means are used in social software separately or in combination, including text-based chat rooms and forums that use voice, video text or avatars. The concept of a community of practice refers to the process of social learning that occurs when people who have a common interest in some subject or problem collaborate over an extended period to share ideas, find solutions, and build innovations. Such groups form from regular interactions and which make use of social platform sites for ecommerce, collecting and exchange of ideas and items. It is contemplated that the systems and methods disclosed herein will be used to transact and provide the needed ecommerce transactions for such communities and groups and such can occur on any internet or networked device including servers, desktop computers, laptop computers, notebook computers, smartphones, mobile devices, tablet devices, or any other mobile, enterprise, or consumer computing device or application that is capable of communicating over a network regardless of the operating system. As referred to herein, the network is not necessarily limited to an Internet network, and may include Ethernets, LANs, WANs wired networks, fiber optic networks, wireless networks, cellular networks, and any other networks that are compliant with data standards known to one of ordinary skill in the art, such as, but not limited to those recognized by the IEEE.

It is also contemplated that the social platform site disclosed herein will provide the tools used in industrial business-to-business procurement. It may be useful in such an auction environment that the role of the buyer and seller are reversed, with the primary objective to drive purchase prices downward. In an ordinary auction (also known as a forward auction), buyers compete to obtain a good or service. In a reverse auction, sellers compete to obtain business. Reverse auctions are used by many purchasing and supply management organizations for spend management, as part of strategic sourcing and overall supply management activities and may be provided by the systems and methods disclosed herein.

Use of Web 2.0 is a trend in World Wide Web technology and web design. It is a second generation of web-based communities and hosted services such as social-networking sites, wikis, blogs, and folksonomies, which aim to facilitate creativity, collaboration, and sharing among users. Web 2.0 websites allow users to do more than just retrieve information. They can build on the interactive facilities of "Web 1.0" to provide "network as platform" computing, allowing users to run software-applications entirely through a browser. Users can own the data on a Web 2.0 site and exercise control over that data. These sites may have an "architecture of participation" that encourages users to add value to the application as they use it. Web 2.0 characteristics and design functionality is contemplated by the systems and methods, including the ecommerce, auction and social platform techniques disclosed herein.

Many of the functional units described in this specification have been labeled as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically, comprise the module and achieve the stated purpose for the module. A module of executable code may be a single instruction, or many instructions, and may be distributed over several different code segments, among different programs, and across several memory devices. Similarly, operational data and data elements may be identified and illustrated herein within modules, and may be embodied in any suitable form and organized within any suitable type of data structure. The operational data and data elements may be collected as a single data set, or may be distributed over different locations including over different storage devices, and may exist, at least partially, as electronic signals on a system or network.

A non-transitory computer-readable medium or computer program product may be embodied by a transmission line, a compact disk, digital-video disk, a magnetic tape, a Bernoulli drive, a magnetic disk, a punch card, flash memory, integrated circuits, or other digital processing apparatus memory device or bulk storage medium. Furthermore, the described features, structures, or characteristics of the invention may be combined in any suitable manner in one or more embodiments. In the forgoing description, numerous specific details are provided, such as examples of programming, software modules, user selections, network transactions, database queries, database structures, hardware modules, hardware circuits, hardware chips, and other semiconductor devices to provide a thorough understanding of embodiments of the invention. One skilled in the art will recognize, however, that the invention may be practiced without one or more of the specific details, or with other methods, components, materials, and the like. In other instances, well-known structures, materials, or operations are not shown or described in detail to avoid obscuring aspects of the invention.

The method, system and non-transitory computer-readable medium having programming instructions stored thereon of the present invention may be performed by a computer program or computer program product. The computer program can exist in a variety of forms both active and inactive. The system and apparatus can take the form of a computer program product accessible from a non-transitory computer-readable or non-transitory computer-usable medium providing program code for use by or in connection with a computer or any instruction execution system. For example, the computer program product can exist as software possessing program instructions or statements in source code, object code, executable code or other formats; firmware program(s); or hardware description language (HDL) files. Any of the above can be embodied on a non-transitory computer readable medium, which include storage devices and signals, in compressed or uncompressed form. Computer readable signals, whether modulated using a carrier or not, can include heartbeat data packages, error data packages, test data packages and the like, all described above.

It will be understood by those skilled in the art that a computer system or data processing system hosting or running the computer program can be configured to access a variety of signals, including but not limited to signals downloaded through the internet or other networks. Such may include distribution of executable software program(s) over a network, distribution of computer programs on a CD ROM or via Internet download and the like. These instructions may reside, for example, in RAM, ROM or other storage media of the computer. Alternatively, the instructions may be contained on a data storage or computer-readable medium, such as a computer CD, DVD, ROM, RAM, CD-ROM, CD-R/W or diskette. Furthermore, the instructions may be stored on a DASD array, magnetic tape, conventional hard disk drive, electronic read-only memory, flash memory, optical storage device, or other appropriate data storage device. In such an alternate embodiment, the computer-executable instructions may be lines of compiled executable code as available in any computer executable code, steps or language.

A computer or data processing system suitable for storing and/or executing program code may include at least one processor coupled directly or indirectly to memory elements through a system bus. The memory elements may include local memory employed during actual execution of the program code, bulk storage, and cache memories that provide temporary storage of at least some program code in order to reduce the number of times code is retrieved from bulk storage during execution. Input/output or I/O devices (including but not limited to keyboards, displays, pointing devices, and other user interfaces) may be coupled to the system either directly or through intervening I/O controllers. Network adapters may also be coupled to the system to enable the data processing system to become coupled to one or more data processing systems or remote printers or storage devices through private or public networks. Modems, cable modem and Ethernet cards are just a few of the currently available types of network adapters.

The invention has been described with reference to preferred implementations or embodiments thereof but it will be appreciated that variations and modifications within the scope of the claimed invention will be suggested to those skilled in the art. For example, the invention may be implemented on networks including ethernet, token ring and the like or used to control other aspects of a system. The method, apparatus and computer code of the present invention may be extended to monitor other devices which exhibit a plurality of operational modes. Reference throughout this specification to "the embodiment," "this embodiment," "the previous embodiment," "one embodiment," "an embodiment," "a preferred embodiment" "another preferred embodiment or similar language means that a particular feature, structure, or characteristic described in connection with the embodiment is included in at least one embodiment of the present invention. Thus, appearances of the phrases "in the embodiment," "in this embodiment," "in the previous embodiment," "in one embodiment," "in an embodiment," "in a preferred embodiment," "in another preferred embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

While the present invention has been described in connection with certain exemplary or specific embodiments, it is to be understood that the invention is not limited to the disclosed embodiments, but, on the contrary, is intended to cover various modifications, alternatives, modifications and equivalent arrangements as will be apparent to those skilled in the art. Any such changes, modifications, alternatives, modifications, equivalents and the like may be made without departing from the spirit and scope of the invention.

What is claimed is:

1. A computer-implemented method for conducting an electronic commerce transaction comprising:
   creating an item having associated item data elements;
   storing the item data elements in a database;
   providing real time announcements by a seller and by a buyer over a social platform and creating data elements related to each real time announcement of the seller and the buyer for storage in the database;
   choosing a selling process for selling the item over the social platform from at least one of offering the item for sale at a fixed price, soliciting an offer for the item and setting an auction for the item;
   generating, by a processor, sales data elements for each chosen selling process and storing the sales data elements in the database;
   displaying the item for sale on the social platform using the item data elements and the sales data elements for the chosen selling process;

the seller receiving an offer, bid or purchase for the item over the social platform;

the seller accepting or rejecting the offer, bid or purchase;

upon the seller accepting the offer, bid or purchase processing payment for the buyer including monitoring one of the number of previous transactions by the buyer within a time interval, payments made by the buyer within a second time interval, and a third time interval between transactions by the buyer;

upon processing payment for the buyer, accepting payment for the seller including monitoring one of the number of previous transactions by the seller within a time interval, payments made by the seller within a second time interval, and a third time interval between transactions by the seller; and a seller and buyer rating module which captures buyer and seller activity on the social platform and develops a rating for each buyer and a rating for each seller registered on the social platform based on details of the transaction and having a rating range that does not immediately affect the rating for the buyer or the for the seller as displayed on the social platform.

2. The computer-implemented method of claim 1 wherein processing payment for the buyer includes declining the transaction based on the results of one or more of monitoring the number of previous transactions by the buyer within a time interval, monitoring payments made by the buyer within a second time interval, monitoring a third time interval between transactions by the buyer, monitoring the number of previous transactions by the seller within a time interval, monitoring payments made by the seller within a second time interval, or monitoring a third time interval between transactions by the seller.

3. The computer-implemented method of claim 1 further including choosing an amount of the electronic commerce transaction over the social platform from the payment processed for the buyer or the payment accepted for the seller for donation to a chosen entity.

4. The computer-implemented method of claim 1 further including processing payment for the seller by implementing a seller payout which collects a processing fee through the social platform.

5. The computer-implemented method of claim 4 wherein processing payment for the seller by implementing a seller payout includes setting one of a merchant discount rate for providing a discount to the seller of a processing fee charged by the social platform, a transaction fee for each payment processed, a hold back for each seller, a payout cycle to each seller and a maximum payout per payout cycle.

6. The computer-implemented method of claim 5 including a maximum payout to the seller consisting of the payment accepted for the seller reduced by the merchant discount rate, the transaction fee, and the hold back for each seller.

7. The computer-implemented method of claim 1 wherein the seller and buyer rating module develops a rating for each buyer and for each seller registered on the social platform based on one or more of the amount of the transaction for a buyer or a seller, the speed of shipment by a seller, the acceptance by a seller of a returned item, the speed with which a buyer pays, the number of items returned by a buyer, number of cancelled purchases by a buyer and the number of times the buyer requests a cancellation.

8. The computer-implemented method of claim 7 wherein the seller and buyer rating module develops a rating for each buyer and for each seller registered on the social platform based on the amount of the transaction for a buyer or a seller over a given period of time.

9. A system for conducting an electronic commerce transaction comprising:

a processor-implemented module for creating an item having associated item data elements;

a processor-implemented module for storing the item data elements in a database;

a processor-implemented module for providing real time announcements by a seller and by a buyer over a social platform and creating data elements related to each real time announcement of the seller and the buyer for storage in the database;

a processor-implemented module for choosing a selling process for selling the item over the social platform from at least one of offering the item for sale at a fixed price, soliciting an offer for the item and setting an auction for the item;

a processor-implemented module for generating sales data elements for each chosen selling process and storing the sales data elements in the database;

a processor-implemented module for displaying the item for sale on the social platform using the item data elements and the sales data elements for the chosen selling process;

a processor-implemented module receiving an offer, bid or purchase for the item over the social platform, then accepting the offer, bid or purchase by the seller;

a processor-implemented module for accepting the offer, bid or purchase by the seller, then processing payment for the buyer including monitoring one of the number of previous transactions by the buyer within a time interval, payments made by the buyer within a second time interval, and a third time interval between transactions by the buyer;

a processor-implemented module for processing payment for the buyer, then accepting payment for the seller including monitoring one of the number of previous transactions by the seller within a time interval, payments made by the seller within a second time interval, and a third time interval between transactions by the seller;

a processor-implemented module for rating the seller and the buyer including capturing buyer and seller activity on the social platform and developing a rating for each buyer and a rating for each seller registered on the social platform based on details of the transaction and having a rating range that does not immediately affect the rating for the buyer or the rating for the seller as displayed on the social platform; and at least one processor for executing at least one of said modules.

10. The system of claim 9 wherein the processor-implemented module for processing payment for the buyer includes a processor-implemented module for declining the transaction based on the results of one or more of monitoring the number of previous transactions by the buyer within a time interval, monitoring payments made by the buyer within a second time interval, monitoring a third time interval between transactions by the buyer, monitoring the number of previous transactions by the seller within a time interval, monitoring payments made by the seller within a second time interval, or monitoring a third time interval between transactions by the seller.

11. The system of claim 9 further comprising a processor-implemented module for choosing an amount of the electronic commerce transaction over the social platform from the payment processed for the buyer or the payment accepted for the seller for donation to a chosen entity.

12. The system of claim 9 further comprising a processor-implemented module for processing payment for the seller by implementing a seller payout which collects a processing fee through the social platform.

13. The system of claim 12 wherein the processor-implemented module for processing payment for the seller by implementing a seller payout includes a processor-implemented module for setting one of a merchant discount rate for providing a discount to the seller of a processing fee charged by the social platform, a transaction fee for each payment processed, a hold back for each seller, a payout cycle to each seller and a maximum payout per payout cycle.

14. The system of claim 13 further comprising a processor-implemented module for calculating the maximum payout to the seller wherein the processor-implemented module for calculating the maximum payout to the seller includes calculating the payment accepted for the seller reduced by the merchant discount rate, the transaction fee, and the hold back for each seller.

15. The system of claim 9 wherein the processor-implemented module for rating the seller and the buyer develops a rating for each buyer and for each seller registered on the social platform based on one or more of the amount of the transaction for a buyer or a seller, the speed of shipment by a seller, the acceptance by a seller of a returned item, the speed with which a buyer pays, the number of items returned by a buyer, number of cancelled purchases by a buyer and the number of times the buyer requests a cancellation.

16. The system of claim 15 wherein the processor-implemented module for rating the seller and the buyer develops a rating for each buyer and for each seller registered on the social platform based on the amount of the transaction for a buyer or a seller over a given period of time.

17. A non-transitory computer-readable medium having programming instructions stored thereon for conducting an electronic commerce transaction comprising:
creating an item having associated item data elements;
storing the item data elements in a database;
providing real time announcements by a seller and by a buyer over a social platform and creating data elements related to each real time announcement of the seller and the buyer for storage in the database;
choosing a selling process for selling the item over the social platform from at least one of offering the item for sale at a fixed price, soliciting an offer for the item and setting an auction for the item;
generating sales data elements for each chosen selling process and storing the sales data elements in the database;
displaying the item for sale on the social platform using the item data elements and the sales data elements for the chosen selling process;
the seller receiving an offer, bid or purchase for the item over the social platform,
the seller accepting or rejecting the offer, bid or purchase;
upon the seller accepting the offer, bid or purchase, processing payment for the buyer including monitoring one of the number of previous transactions by the buyer within a time interval, payments made by the buyer within a second time interval, and a third time interval between transactions by the buyer;
upon processing payment for the buyer, accepting payment for the seller including monitoring one of the number of previous transactions by the seller within a time interval, payments made by the seller within a second time interval, and a third time interval between transactions by the seller; and
a seller and buyer rating module which captures buyer and seller activity on the social platform and develops a rating for each buyer and a rating for each seller registered on the social platform based on details of the transaction and having a rating range that does not immediately affect the rating for the buyer or the rating for the seller as displayed on the social platform.

18. The non-transitory computer-readable medium of claim 17 wherein processing payment for the buyer includes declining the transaction based on the results of one or more of monitoring the number of previous transactions by the buyer within a time interval, monitoring payments made by the buyer within a second time interval, monitoring a third time interval between transactions by the buyer, monitoring the number of previous transactions by the seller within a time interval, monitoring payments made by the seller within a second time interval, or monitoring a third time interval between transactions by the seller.

19. The non-transitory computer-readable medium of claim 17 further including choosing an amount of the electronic commerce transaction over the social platform from the payment processed for the buyer or the payment accepted for the seller for donation to a chosen entity.

20. The non-transitory computer-readable medium of claim 17 further including processing payment for the seller by implementing a seller payout which collects a processing fee through the social platform.

21. The non-transitory computer-readable medium of claim 20 wherein processing payment for the seller by implementing a seller payout includes setting one of a merchant discount rate for providing a discount to the seller of a processing fee charged by the social platform, a transaction fee for each payment processed, a hold back for each seller, a payout cycle to each seller and a maximum payout per payout cycle.

22. The non-transitory computer-readable medium of claim 21 including a maximum payout to the seller consisting of the payment accepted for the seller reduced by the merchant discount rate, the transaction fee, and the hold back for each seller.

23. The non-transitory computer-readable medium of claim 17 wherein the seller and buyer rating module develops a rating for each buyer and for each seller registered on the social platform based on one or more of the amount of the transaction for a buyer or a seller, the speed of shipment by a seller, the acceptance by a seller of a returned item, the speed with which a buyer pays, the number of items returned by a buyer, number of cancelled purchases by a buyer and the number of times the buyer requests a cancellation.

24. The non-transitory computer-readable medium of claim 23 wherein the seller and buyer rating module develops a rating for each buyer and for each seller registered on the social platform based on the amount of the transaction for a buyer or a seller over a given period of time.

\* \* \* \* \*